(12) United States Patent
Sawai

(10) Patent No.: US 8,989,448 B2
(45) Date of Patent: Mar. 24, 2015

(54) MOVING OBJECT DETECTING DEVICE, MOVING OBJECT DETECTING METHOD, MOVING OBJECT DETECTION PROGRAM, MOVING OBJECT TRACKING DEVICE, MOVING OBJECT TRACKING METHOD, AND MOVING OBJECT TRACKING PROGRAM

(75) Inventor: Shogo Sawai, Bunkyo-ku (JP)

(73) Assignee: Morpho, Inc., Tokyo (JP)

( * ) Notice: Subject to any disclaimer, the term of this patent is extended or adjusted under 35 U.S.C. 154(b) by 781 days.

(21) Appl. No.: 13/256,848

(22) PCT Filed: Mar. 22, 2011

(86) PCT No.: PCT/JP2011/056806
§ 371 (c)(1),
(2), (4) Date: Sep. 15, 2011

(87) PCT Pub. No.: WO2012/127618
PCT Pub. Date: Sep. 27, 2012

(65) Prior Publication Data
US 2012/0243733 A1 Sep. 27, 2012

(51) Int. Cl.
G06K 9/00 (2006.01)
H04N 7/18 (2006.01)
G06T 7/20 (2006.01)

(52) U.S. Cl.
CPC ..... *G06T 7/2006* (2013.01); *G06T 2207/10016* (2013.01); *G06T 2207/10024* (2013.01); *G06T 2207/20021* (2013.01); *G06T 2207/30201* (2013.01)
USPC ............................. 382/107; 382/162; 348/152

(58) Field of Classification Search
CPC . H04N 5/144; H04N 5/145; H04N 19/00278; H04N 19/0063; H04N 19/00266; H04N 19/00739; H04N 7/26808; H04N 7/368; G06T 2207/10016; G06T 7/2006; G06T 7/0097; G06T 7/20; G06T 2207/10024; G06K 9/00234; G06K 9/00261; G06K 9/00281; G06K 9/00355; G06K 9/00369; G06K 9/3233; G06K 9/3241; G06K 9/52; G06F 17/30811; G06F 17/30799; G06F 17/3079; G06F 17/03
See application file for complete search history.

(56) References Cited

U.S. PATENT DOCUMENTS 6,005,625 A 12/1999 Yokoyama
6,035,067 A * 3/2000 Ponticos ...................... 382/226
(Continued)

FOREIGN PATENT DOCUMENTS

CN 1360436 A 7/2002
CN 1998227 A 7/2007
(Continued)

OTHER PUBLICATIONS

Office Action issued by Japanese Patent Office in Japanese Patent Application No. 2012-024015 dated Aug. 13, 2013.
(Continued)

*Primary Examiner* — Manav Seth
(74) *Attorney, Agent, or Firm* — Sughrue Mion, PLLC

(57) ABSTRACT

A moving object detecting device 1 that detects a moving object by using an image includes a motion degree obtaining portion 11 that obtains a motion degree of a pixel between image frames, a color obtaining portion 13 that obtains the color of the pixel included in the image frame, an evaluation score calculating portion 14 that calculates an evaluation score indicating a motion level of the color on the basis of the motion degree for each color obtained by the color obtaining portion, and a moving object detecting portion 15 that detects the moving object on the basis of the evaluation score for each color.

20 Claims, 26 Drawing Sheets

(56) References Cited

U.S. PATENT DOCUMENTS

| | | | |
|---|---|---|---|
| 6,124,864 A * | 9/2000 | Madden et al. | 345/473 |
| 6,400,831 B2 * | 6/2002 | Lee et al. | 382/103 |
| 6,480,615 B1 * | 11/2002 | Sun et al. | 382/103 |
| 6,493,041 B1 * | 12/2002 | Hanko et al. | 348/699 |
| 6,888,891 B2 * | 5/2005 | Lee et al. | 375/240.19 |
| 7,146,023 B2 * | 12/2006 | Kondo et al. | 382/107 |
| 7,151,843 B2 * | 12/2006 | Rui et al. | 382/103 |
| 7,302,004 B2 * | 11/2007 | Zhang et al. | 375/240.16 |
| 7,356,082 B1 * | 4/2008 | Kuhn | 375/240.16 |
| 7,526,102 B2 * | 4/2009 | Ozer | 382/103 |
| 7,536,043 B2 * | 5/2009 | Fan et al. | 382/128 |
| 7,548,659 B2 * | 6/2009 | Ofek et al. | 382/254 |
| 7,596,280 B2 * | 9/2009 | Bilbrey et al. | 382/274 |
| 7,653,265 B2 * | 1/2010 | Ruggiero | 382/303 |
| 7,672,526 B2 * | 3/2010 | Kondo et al. | 382/254 |
| 2006/0244866 A1 | 11/2006 | Kishida | |

FOREIGN PATENT DOCUMENTS

| | | | |
|---|---|---|---|
| JP | 8-063601 A | 3/1996 | |
| JP | 9-091453 A | 4/1997 | |
| JP | 2003319387 A | 11/2003 | |
| JP | 2006-109250 A | 4/2006 | |
| JP | 2006-260049 A | 9/2006 | |
| JP | 2007213264 A | 8/2007 | |
| JP | 2009-219082 A | 9/2009 | |
| JP | 2009-239515 A | 10/2009 | |
| JP | 2010-021597 A | 1/2010 | |
| JP | 2011-039604 A | 2/2011 | |

OTHER PUBLICATIONS

International Preliminary Report on Patentability in International Application No. PCT/JP2011/056806 dated Oct. 3, 2013.

International Preliminary Report on Patentability in International Application No. PCT/JP2011/056806 dated Oct. 8, 2013.

Communication dated Oct. 20, 2014, issued by the European Patent Office in counterpart Application No. 11758359.1.

Hsuan-Sheng Chen et al., "Pitch-By-Pitch Extraction from Single view baseball video sequences", 2007 IEEE, International Conference on Multimedia and Expo, Jul. 5, 2007, pp. 1423-1426.

Zhonghua Dang et al., "Replay Detection Based on Semi-automatic Logo Template Sequence Extraction in Sports Video", Fourth International Conference on Image and Graphics, 2007, ICIG 2007, Aug. 24, 2007, pp. 839-844.

Lixia Xue et al., "Method for Adaptively Detecting Moving Objects based on Frame Difference", Application Research Computers, vol. 28, Issue 4, Apr. 30, 2011, pp. 1551-1552, 1559.

Lei Huang et al., "Research for Detecting Moving Object based on Background Difference", Software Guide, vol. 8, Issue 6, Jun. 30, 2009, pp. 187-188.

Communication dated Oct. 23, 2014 from The State Intellectual Property Office of the People's Republic of China in counterpart Chinese Patent Application No. 201180001671.4.

* cited by examiner (A)

(B)

(A)

(B)

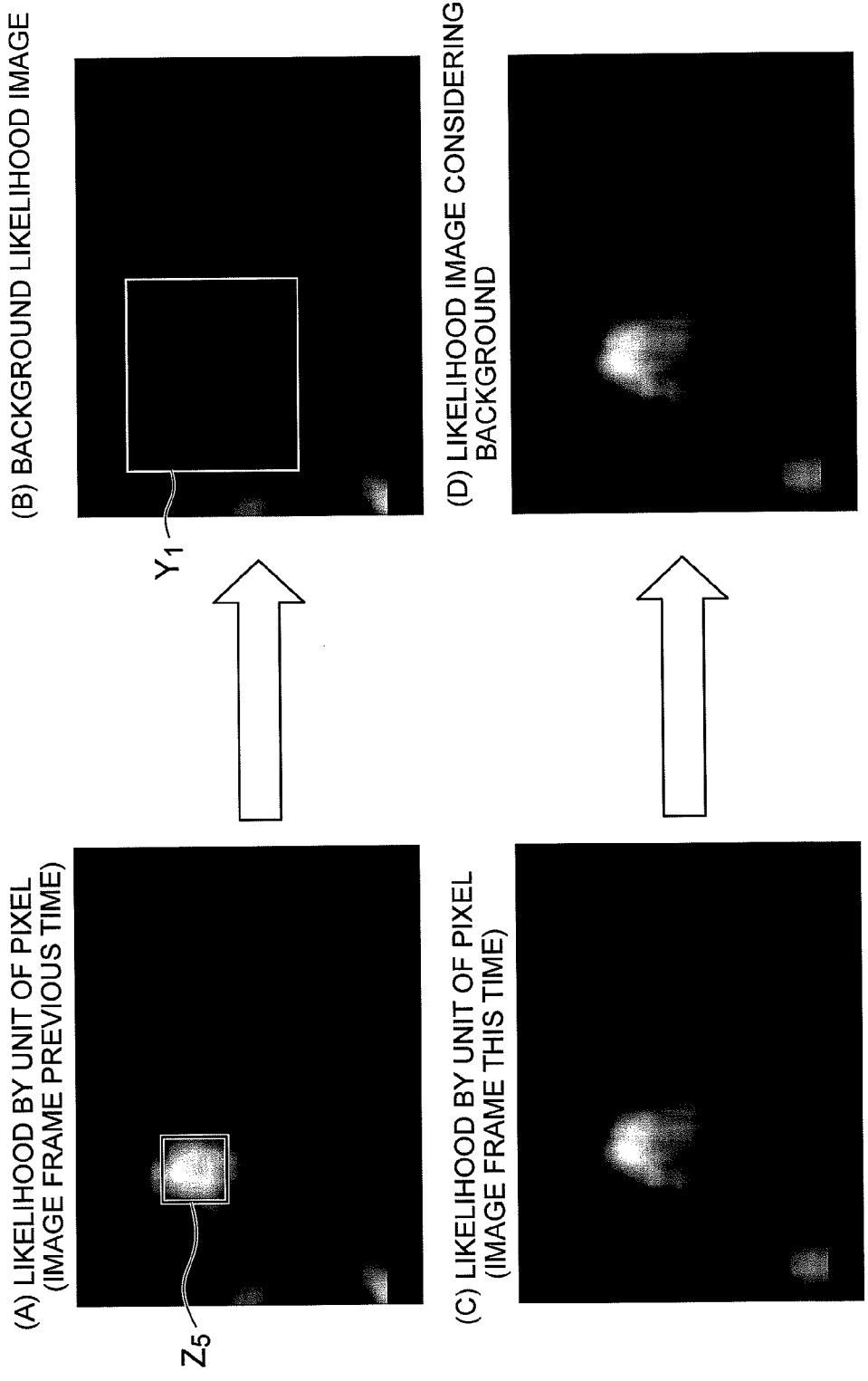

MOVING OBJECT DETECTING DEVICE, MOVING OBJECT DETECTING METHOD, MOVING OBJECT DETECTION PROGRAM, MOVING OBJECT TRACKING DEVICE, MOVING OBJECT TRACKING METHOD, AND MOVING OBJECT TRACKING PROGRAM

CROSS REFERENCE TO RELATED APPLICATION

This application is a National Stage of International Application No. PCT/JP2011/056806, filed on Mar. 22, 2011, the contents of all of which are incorporated herein by reference in their entirety.

TECHNICAL FIELD

The present invention relates to a moving object detecting device, a moving object detecting method, and a moving object detection program as well as a moving object tracking device, a moving object tracking method, and a moving object tracking program.

BACKGROUND ART

Hitherto, a device that detects a moving object using an image or a device that tracks a moving object using an image has been known (See Patent Documents 1 and 2, for example). The device described in Patent Document 1 detects a moving object by dividing an image frame into a plurality of small blocks, defining a minimum value of an integrated value of motion vectors for each small block as a background motion vector, and separating the background by subtracting it from the original image frame. The device described in Patent Document 2 sets the color of a moving object according to type in advance, acquires a content rate and variance of the color of the moving object in a target area of an image and determines that there is the type of the moving object corresponding to the set color if the content rate and variance satisfy a predetermined condition. Also, the device described in Patent Document 2 estimates distribution of the color of the background in advance, detects a different-colored image group from a difference from the background color and specifies the location of the moving object by using this different-colored image group.

CITATION LIST

Patent Literature

Patent Document 1: Japanese Unexamined Patent Application Publication No. 2003-319387
Patent Document 2: Japanese Unexamined Patent Application Publication No. 2007-213264

SUMMARY OF INVENTION

Technical Problem

However, in the device described in Patent Document 1, if the background moves at random, it becomes difficult to distinguish motion of the background from the motion of the moving object. Thus, detection of the moving object might become unstable. Also, in the device described in Patent Document 2, since it is necessary to specify the color of the moving object in advance and to estimate distribution of the color of the background in advance, in the case of a change in the environment such as a lighting change, clothes change and the like, it might become impossible to detect the moving object.

The present invention was made in order to solve such technical problems and has an object to provide a moving object detecting device, a moving object detecting method, and a moving object detection program that can stably detect a moving object without setting information relating to the moving object or a background in advance, as well as a moving object tracking device, a moving object tracking method, and a moving object tracking program.

Solution to Problem

That is, the moving object detecting device according to the present invention is a moving object detecting device that detects a moving object by using an image and includes a motion degree obtaining portion that obtains a motion degree of a pixel between image frames, a color obtaining portion that obtains the color of the pixel included in the image frame, an evaluation score calculating portion that calculates an evaluation score indicating a motion level of the color on the basis of the motion degree for each color obtained by the color obtaining portion, and a moving object detecting portion that detects the moving object on the basis of the evaluation score for each color.

In the moving object detecting device according to the present invention, the motion degree of the pixel between the image frames is obtained by the motion degree obtaining portion, the color of the pixel included in the image frame is obtained by the color obtaining portion, the evaluation score indicating the motion level of the color is calculated for each color by the evaluation score calculating portion on the basis of the motion degree, and the moving object is detected by the moving object detecting portion on the basis of the evaluation score for each color. As described above, by evaluating the motion level of the color, a moving object is detected. Thus, a moving object can be detected without setting information relating to the moving object or a background in advance. Also, since the moving object can be detected without separating the moving object from the background by using a motion vector, the moving object can be stably detected.

Here, the evaluation score calculating portion may accumulate number of pixels and motion degree of the pixel for each color in the image frame and calculate the evaluation score of the color on the basis of the accumulated number of pixels and the accumulated motion degree in the image frame. By configuring as above, accuracy of the evaluation score for each color can be improved.

Also, the evaluation score calculating portion may accumulate positional information of the pixel for each color, and the moving object detecting portion may specify the position of the moving object on the basis of the accumulated number of pixels and the accumulated positional information for each color. By configuring as above, accuracy of the position of the moving object can be improved.

Also, the moving object detecting method according to the present invention is a moving object detecting method that detects a moving object using an image and includes the steps of obtaining a motion degree of a pixel between a first image frame and a second image frame input after the first image frame and a color of the pixel included in the second image frame, calculating an evaluation score indicating a motion level of the color on the basis of the motion degree for each color obtained in the obtaining step, and detecting the moving object drawn in the second image frame on the basis of the evaluation score for each color.

The moving object detecting method according to the present invention exerts the same advantage as that of the above-described moving object detecting device of the present invention.

Also, a moving object detection program according to the present invention is a moving object detection program that causes a computer to function so as to detect a moving object by using an image and is configured to cause the computer to function as a motion degree obtaining portion that obtains the motion degree of a pixel between image frames, a color obtaining portion that obtains the color of the pixel included in the image frame, an evaluation score calculating portion that calculates an evaluation score indicating a motion level of the color on the basis of the motion degree for each color obtained by the color obtaining portion, and a moving object detecting portion that detects the moving object on the basis of the evaluation score for each color.

The moving object detection program according to the present invention exerts the same advantage as that of the above-described moving object detecting device of the present invention.

Also, a moving object tracking device according to the present invention is a moving object tracking device that tracks a moving object by using an image and includes a motion degree obtaining portion that obtains the motion degree of a pixel between image frames, a color obtaining portion that obtains the color of the pixel included in the image frame, an evaluation score calculating portion that calculates an evaluation score indicating a motion level of the color on the basis of the motion degree for each color obtained by the color obtaining portion, a moving object detecting portion that detects the moving object by creating a first likelihood image having the evaluation score as a pixel value, and a moving object tracking portion that tracks the detected moving object.

In the moving object tracking device according to the present invention, the motion degree of the pixel between the image frames is obtained by the motion degree obtaining portion, the color of the pixel included in the image frame is obtained by the color obtaining portion, the evaluation score indicating the motion level of the color is calculated for each color by the evaluation score calculation portion on the basis of the motion degree, the first likelihood image having the evaluation score as the pixel value is created and the moving object is detected by the moving object detecting portion on the basis of the color of the pixel and the evaluation score for each color, and the detected moving object is tracked by the moving object tracking portion. As described above, the moving object is detected by evaluating the motion level of the color. Then, the moving object is tracked on the basis of the color of the detected moving object. Thus, the moving object can be tracked without setting information relating to the moving object or background in advance. Also, since the moving object can be tracked without separating the moving object from the background by using a motion vector, the moving object can be stably tracked.

Here, the motion degree obtaining portion divides the image frame into predetermined blocks, calculates the motion of the entire image frame on the basis of the motion by the unit of block, and calculates the motion degree by subtracting the motion of the entire image frame from the motion of the pixel included in the image frame. By configuring as above, a local motion can be obtained from the difference from the entire motion.

The moving object tracking portion may also track the moving object on the basis of the color of the moving object detected by the moving object detecting portion. By configuring as above, tracking can be made on the basis of the color of the detected moving object.

Also, the moving object tracking portion may specify a representative color of the moving object on the basis of the evaluation score and track the moving object on the basis of the specified representative color. In this case, the moving object tracking portion may calculate likelihood for each color on the basis of similarity in color to the representative color of the moving object and create a second likelihood image having the likelihood of the pixel as a pixel value so as to track the moving object. By using the second likelihood image as above, the color which is the same as or similar to the representative color of the moving object can be distinguished from other colors more accurately.

Also, the evaluation score calculating portion may calculate the number of foreground pixels obtained by accumulating the number of pixels, the motion degree of each being a predetermined value or more and the number of background pixels obtained by accumulating the number of pixels, the motion degree of each being not more than the predetermined value for each color and the moving object racking portion may reduce the likelihood for the color for which the number of foreground pixels is smaller than the number of background pixels. By configuring as above, tracking of a background or the like in a color close to the color of the moving body and with less motion as a moving object can be avoided.

Also, the moving object tracking portion may reduce the likelihood in the pixel if an inner product of a relative position vector of the pixel on the basis of the position of the moving object the previous time and the motion vector of the pixel is negative. By configuring as above, tracking of a background or the like in a color close to the color of the moving object and with a different motion as a moving object can be avoided.

Also, the moving object tracking portion may set a region smaller than the second likelihood image as a tracking rectangle and track the moving object by moving it so that the center of gravity of distribution of pixel values in the tracking rectangle of the second likelihood image comes to the center of the tracking rectangle. By configuring as above, the moving object can be tracked properly with a simple configuration.

Also, the moving object tracking portion may track the moving object by using a difference image between a background likelihood image created on the basis of the second likelihood image of the image frame input the previous time and the tracking rectangle and the second likelihood image of the image frame. By configuring as above, tracking of a background or the like in a color close to the color of the moving object as the moving object can be avoided.

The moving object tracking method according to the present invention is a moving object tracking method that tracks a moving object by using an image and includes the steps of obtaining a motion degree of a pixel between image frames and a color of the pixel included in the image frame, calculating an evaluation score indicating a motion level of the color on the basis of the motion degree for each color obtained in the obtaining step, detecting the moving object by creating a first likelihood image having the evaluation score as a pixel value on the basis of the color of the pixel and the evaluation score for each color, and tracking the detected moving object.

The moving object tracking method according to the present invention exerts the same advantage as that of the above-described moving object tracking device of the present invention.

Also, the moving object tracking program according to the present invention is a moving object tracking program that causes a computer so as to track a moving object by using an image, and is configured to cause the computer to function as a motion degree obtaining portion that obtains a motion degree of a pixel between image frames, a color obtaining portion that obtains the color of the pixel included in the image frame, an evaluation score calculating portion that calculates an evaluation score indicating a motion level of the color on the basis of the motion degree for each color obtained by the color obtaining portion, a moving object detecting portion that detects the moving object by creating a first likelihood image having the evaluation score as a pixel value on the basis of the color of the pixel and the evaluation score for each color, and a moving object tracking portion that tracks the detected moving object.

The moving object tracking program according to the present invention exerts the same advantage as that of the above-described moving object tracking device of the present invention.

Advantageous Effects of Invention

According to the present invention, a moving object can be detected stably without setting information relating to the moving object or background in advance.

BRIEF DESCRIPTION OF DRAWINGS

FIG. 26 is an outline diagram for explaining the background likelihood calculation operation. (A), (B), (C) and (D) illustrate a second likelihood image of the image frame the previous time, a background likelihood image, a second likelihood image of the image frame this time, and a likelihood image considering the background, respectively.

DESCRIPTION OF EMBODIMENTS

Figure 1:
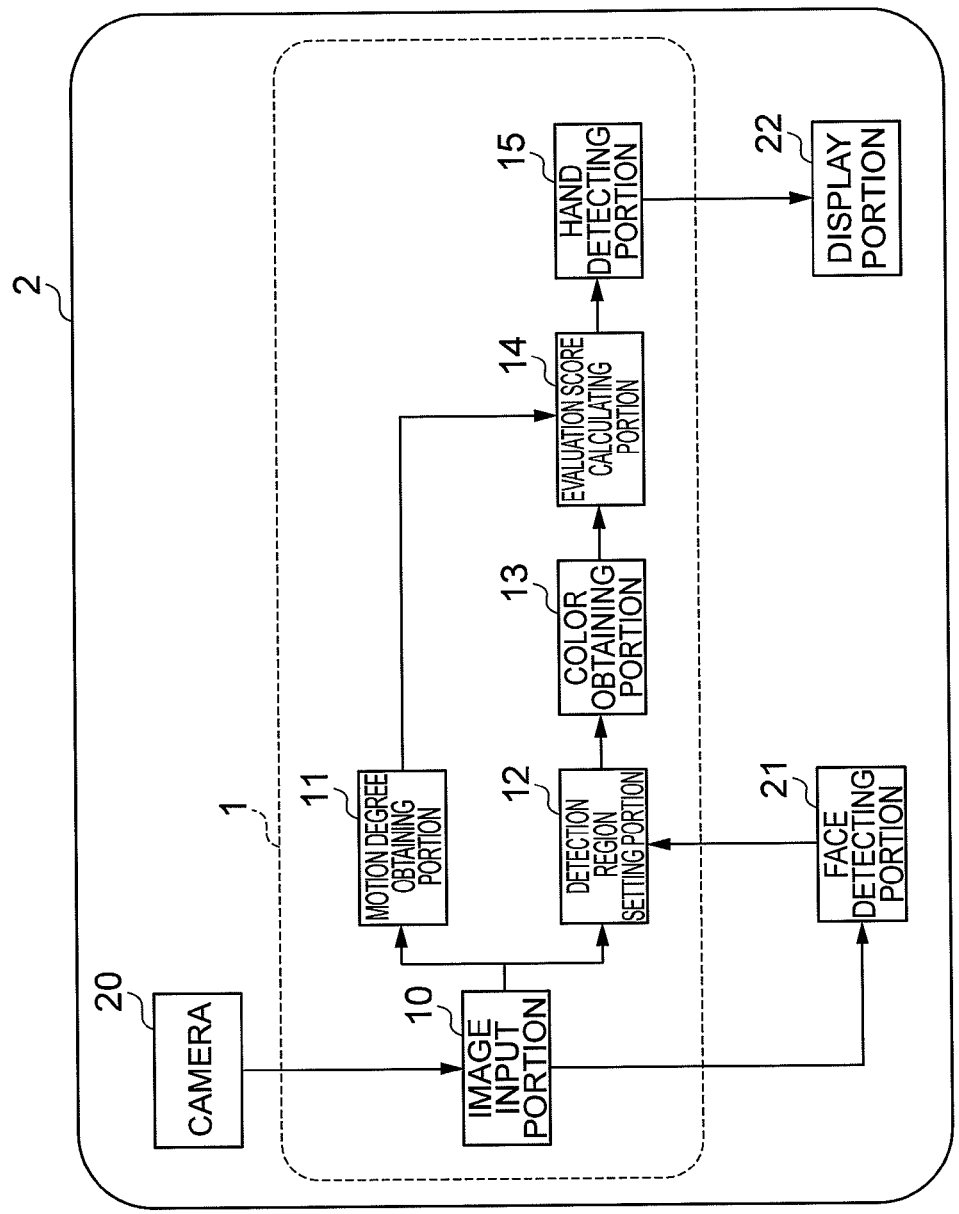
FIG. 1 is a functional block diagram of equipment on which a moving object detecting device according to a first embodiment is mounted.

Embodiments of the present invention will be described below by referring to the attached drawings. In each figure, the same reference numerals are given to the same or corresponding portions and duplicated explanation will be omitted.

(First Embodiment)

A moving object detecting device according to this embodiment is a device that detects a moving object by using an image. The moving object detecting device according to this embodiment is suitably employed for a device that detects a moving object such as a gesture recognizing device that recognizes motion of a hand, a monitoring camera that detects an intruder and the like, for example. In the following, considering ease of understanding of the explanation, a hand detecting device that detects a moving hand will be described as an example of a moving object detecting device according to the present invention.

Figure 2:
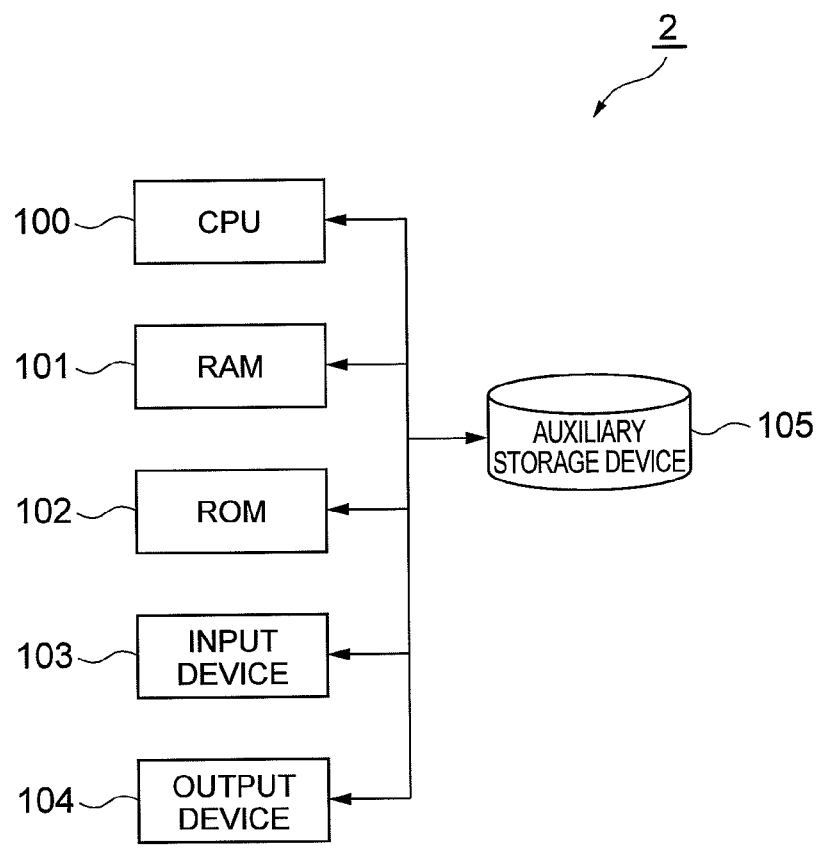
FIG. 2 is a hardware configuration diagram of the equipment illustrated in FIG. 1.

FIG. 1 is a functional block diagram of a device 2 provided with a hand detecting device (moving object detecting device) 1 according to this embodiment. The device 2 illustrated in FIG. 1 is a digital camera, a mobile terminal, a game terminal or a home electric appliance such as a TV and the like and has a hardware configuration illustrated in FIG. 2. FIG. 2 is a hardware configuration diagram of the device 2. As illustrated in FIG. 2, the device 2 is physically configured as a usual computer system which includes a CPU (Central Processing Unit) 100, a main storage device such as a ROM (Read Only Memory) 101, a RAM (Random Access Memory) 102, an input device 103 such as a camera or a keyboard, an output device 104 such as a display, an auxiliary storage device 105 such as a hard disk. Each function of the device 2 and the hand detecting device 1, which will be described later, is realized on hardware by having predetermined computer software read by the CPU 100, the ROM 101, the RAM 102 and the like so that the input device 103 and the output device 104 operate under the control of the CPU 100 and data is read from and written in the main storage device and the auxiliary storage device 105. The description above is made as a hardware configuration of the device 2, but the hand detecting device 1 may be configured as a usual computer system that includes a main storage device such as the CPU 100, the ROM 101, and the RAM 102, the input device 103, the output device 104, the auxiliary storage device 105 and the like. Also, the device 2 may be provided with a communication module and the like.

As illustrated in FIG. 1, the device 2 includes a camera 20, the hand detecting device 1, a face detecting portion 21, and a display portion 22. The camera 20 has a function of picking up an image or a moving image. As the camera 20, an image pickup element or the like, for example, is used. The camera 20 has a function of outputting a plurality of the picked-up images or moving images to the hand detecting device 1 as image frames.

The hand detecting device 1 includes an image input portion 10, a motion degree obtaining portion 11, a detection region setting portion 12, a color obtaining portion 13, an evaluation score calculating portion 14, and a hand detecting portion (moving object detecting portion) 15.

The image input portion 10 is connected to the camera 20. The image input portion 10 has a function of inputting a plurality of the images or moving images picked up by the camera 20 as image frames, for example. The image input portion 10 has a function of storing the input image frames in a storage region provided in the device 2.

The motion degree obtaining portion 11 is configured capable of referring to the image frames input and stored by the image input portion 10. The motion degree obtaining portion 11 has a function of obtaining a motion degree of a pixel between the image frames for each pixel. For example, the motion degree obtaining portion 11 obtains a motion amount for each pixel by using a prior-art technology such as an optical flow and uses it as a motion degree. Alternatively, the motion degree obtaining portion 11 may obtain a difference of pixels between frames and use it as the motion degree. The motion degree obtaining portion 11 has a function of outputting the motion degree of a pixel to the evaluation score calculating portion 14.

The face detecting portion 21 is configured capable of referring to the image frames input and stored by the image input portion 10. The face detecting portion 21 has a function of detecting a face position of a person. The face detecting portion 21 detects positional information of a face by using a discriminator using Haar-Like features, pattern matching or the like, for example. The face detecting portion 21 has a function of outputting the positional information of a face to the detection region setting portion 12.

The detection region setting portion 12 is configured capable of referring to the image frames input and stored by the image input portion 10. The detection region setting portion 12 has a function of setting a detection region, which is a target region where a hand is detected, by using a detection result of the face detecting portion 21. That is, the detection region setting portion 12 sets a detection region by using the positional information of a face. For example, the detection region setting portion 12 has a function of setting regions, each having a predetermined size, adjacent to the face in the right and left as detection regions for a hand. The detection region setting portion 12 has a function of outputting the set detection region to the color obtaining portion 13.

The color obtaining portion 13 has a function of obtaining the color of a pixel included in an image frame. For example, the color obtaining portion 13 has a function of obtaining the color of pixels included in the detection region set by the detection region setting portion 12 in association with the positional information (coordinates) of each of the pixels. The color obtaining portion 13 has a function of converting an obtained pixel value to a unique color ID, considering processing, which will be described later. For example, the color obtaining portion 13 outputs a one-dimensional color ID corresponding to the obtained pixel value if the pixel value is expressed by a YUV color space and component values of Y, U and V are within a range of 0 to 255 (8 bits), respectively. Here, the color obtaining portion 13 may change correspondence relationship between the pixel value and the color ID as appropriate as necessary. For example, by deleting low-order 4 bits in the YUV components (8 bits, respectively) and performing conversion, the number of bits is changed to 12 bits of 0 to 4095. The color obtaining portion 13 has a function of outputting the color ID of each pixel to the evaluation score calculating portion 14.

The evaluation score calculating portion 14 has a function of calculating an evaluation score on the basis of the motion degree for each color ID obtained by the color obtaining portion 13. Here, the evaluation score is an index for evaluating whether or not it is the color of a moving object (hand, here). For example, the evaluation score calculating portion 14 assumes the motion degree of the pixel obtained by the motion degree obtaining portion 11 as the score of the pixel. The evaluation score calculating portion 14 accumulates the score and display frequency (number of pixels) for each color ID on the basis of the score and the color ID of the pixel obtained by the color obtaining portion 13. The evaluation score calculating portion 14 calculates the evaluation score on the basis of the accumulated score and the accumulated number of pixels. For example, by dividing the accumulated score by the accumulated number of pixels, the evaluation score of the color ID is calculated. That is, the evaluation score can be considered to indicate the motion level of the color. Moreover, the evaluation score calculating portion 14 has a function of accumulating the positional information (x-coordinates and y-coordinates, for example) of the pixel for each color ID in order to obtain the position of the hand. The evaluation score calculating portion 14 has a function of outputting the calculated evaluation score and the accumulated positional information for each color ID to the hand detecting portion 15.

The hand detecting portion 15 has a function of detecting a moving hand on the basis of the evaluation score for each color ID output by the evaluation score calculating portion 14. As described above, since the evaluation score indicates the motion level of the color, the hand detecting portion 15 detects that a portion with higher evaluation score than the other portions is an object in the image. The hand detecting portion 15 specifies the position of the hand on the basis of the accumulated positional information and the accumulated number of pixels output by the evaluation score calculating portion 14 for the specified color ID. For example, the hand detecting portion 15 estimates a center position of the hand by dividing the accumulated positional information by the accumulated number of pixels. The hand detecting portion 15 has a function of outputting the information relating to the detected hand to the display portion 22 to be displayed.

The hand detecting portion 15 may also have a function of specifying the color of the hand on the basis of the evaluation score for each color ID, for example. The hand detecting portion 15 selects a representative color, considering that the higher the evaluation score is, the more likely it is the representative color, for example. For example, the color ID having the highest evaluation score is specified as the color (representative color) of the hand. A plurality of the color IDs in a range including the maximum value of the evaluation score may be selected and specified as the color of the hand.

The display portion 22 has a function of displaying the hand detected by the hand detecting portion 15 in a highlighted manner when the current image frame is displayed, for example. As the display portion 22, a liquid crystal display or the like, for example, is used.

Figure 3:
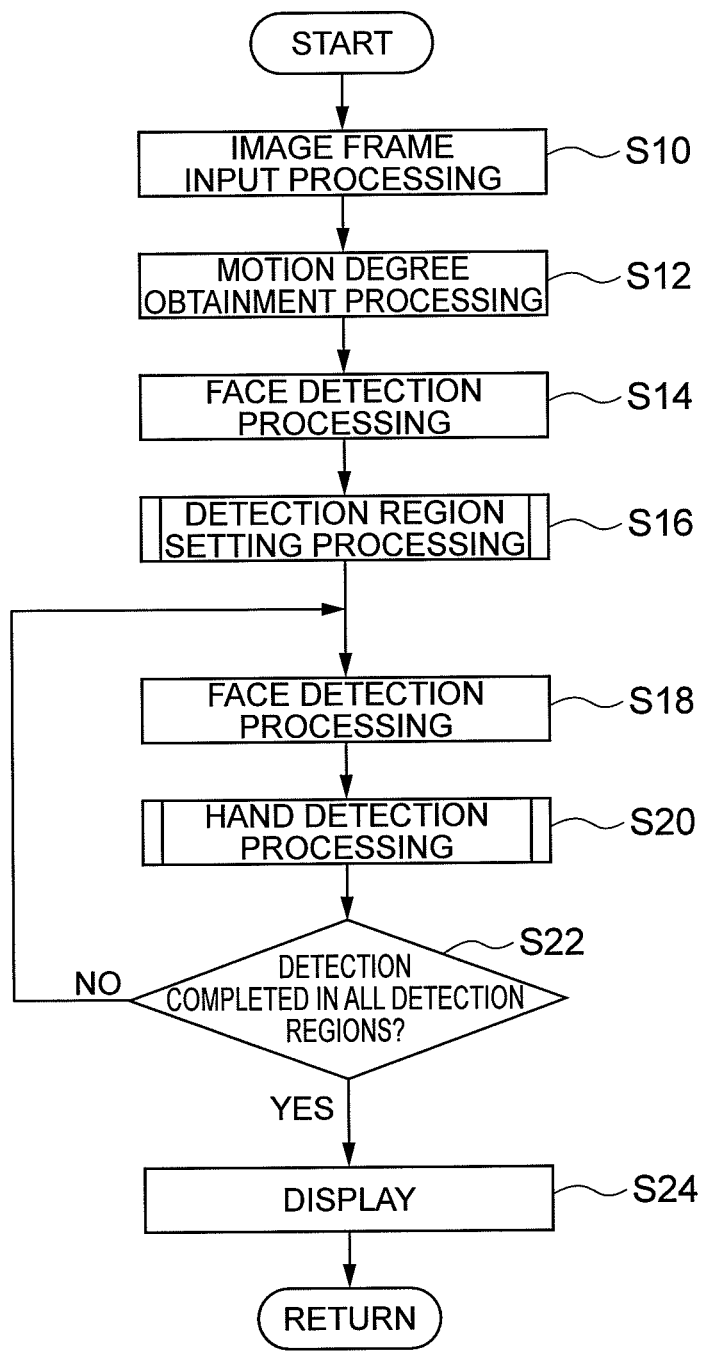
FIG. 3 is a flowchart for explaining an entire operation of the moving object detecting device illustrated in FIG. 1.

Subsequently, an operation of the hand detecting device 1 according to this embodiment will be described. FIG. 3 is a flowchart illustrating an operation of the hand detecting device 1 according to this embodiment. Control processing illustrated in FIG. 3 is executed at timing when an image pickup function of the device 2 is turned on, for example, and repeatedly executed at a predetermined cycle. Considering ease of understanding of the explanation, the explanation will be made assuming that the hand detecting device 1 has input and recorded a first image frame before execution in FIG. 3. Also, an object to be detected is assumed to be a hand in the explanation.

As illustrated in FIG. 3, first, the image input portion 10 inputs an image frame (second image frame) (S10). When processing at S10 is finished, the routine proceeds to motion degree obtainment processing (S12). In the processing at S12, the motion degree obtaining portion 11 obtains the motion degree of a pixel in the image frame obtained in the processing at S10 on the basis of the optical flow or the like. When the processing at S12 is finished, the routine proceeds to face detection processing (S14).

At S14, the face detecting portion 21 detects positional information of the face drawn in the image frame. Here, the face detecting portion 21 may detect a plurality of faces. When the processing at S14 is finished, the routine proceeds to detection region setting processing (S16).

In the processing at S16, the detection region setting portion 12 sets a detection region in the image frame. The detection region setting portion 12 records information relating to the detection region in a detection region list. Details of this processing will be described later. When the processing at S16 is finished, the routine proceeds to detection region selecting processing (S18).

The processing at S18 is processing in which the color obtaining portion 13 selects one detection region by referring to the detection region list recorded in the processing at S16. When the processing at S18 is finished, the routine proceeds to the hand detection processing (S20).

The processing at S20 is processing in which the color obtaining portion 13, the evaluation score calculating portion 14, and the hand detecting portion 15 detect the hand in the detection region selected in the processing at S18. This processing will be described later. When the processing at S20 is finished, the routine proceeds to finish determination processing (S22).

In the processing at S22, it is determined whether or not the color obtaining portion 13 has executed the hand detection processing for all the detection regions recorded in the detection region list. In the processing at S22, if it is determined that the hand detection processing has not been executed for all the detection regions, the routine moves to the processing at S18 again. In the processing at S18, the color obtaining portion 13 refers to the detection region list and selects a new detection region again. As described above, the processing at S18 to S22 is repeatedly executed till the hand detection processing has been executed for all the detection regions described in the detection region list. On the other hand, if it is determined in the processing at S22 that the hand detection processing has been executed for all the detection regions, the routine proceeds to display processing (S24).

In the processing at S24, an image frame highlighted in such a manner that the display portion 22 surrounds the portion of the hand with a rectangle or the like is displayed. If a hand has not been detected in the processing at S20, the display portion 22 displays a usual image frame. The control processing illustrated in FIG. 3 is finished when the processing at S24 is finished.

Figure 4:
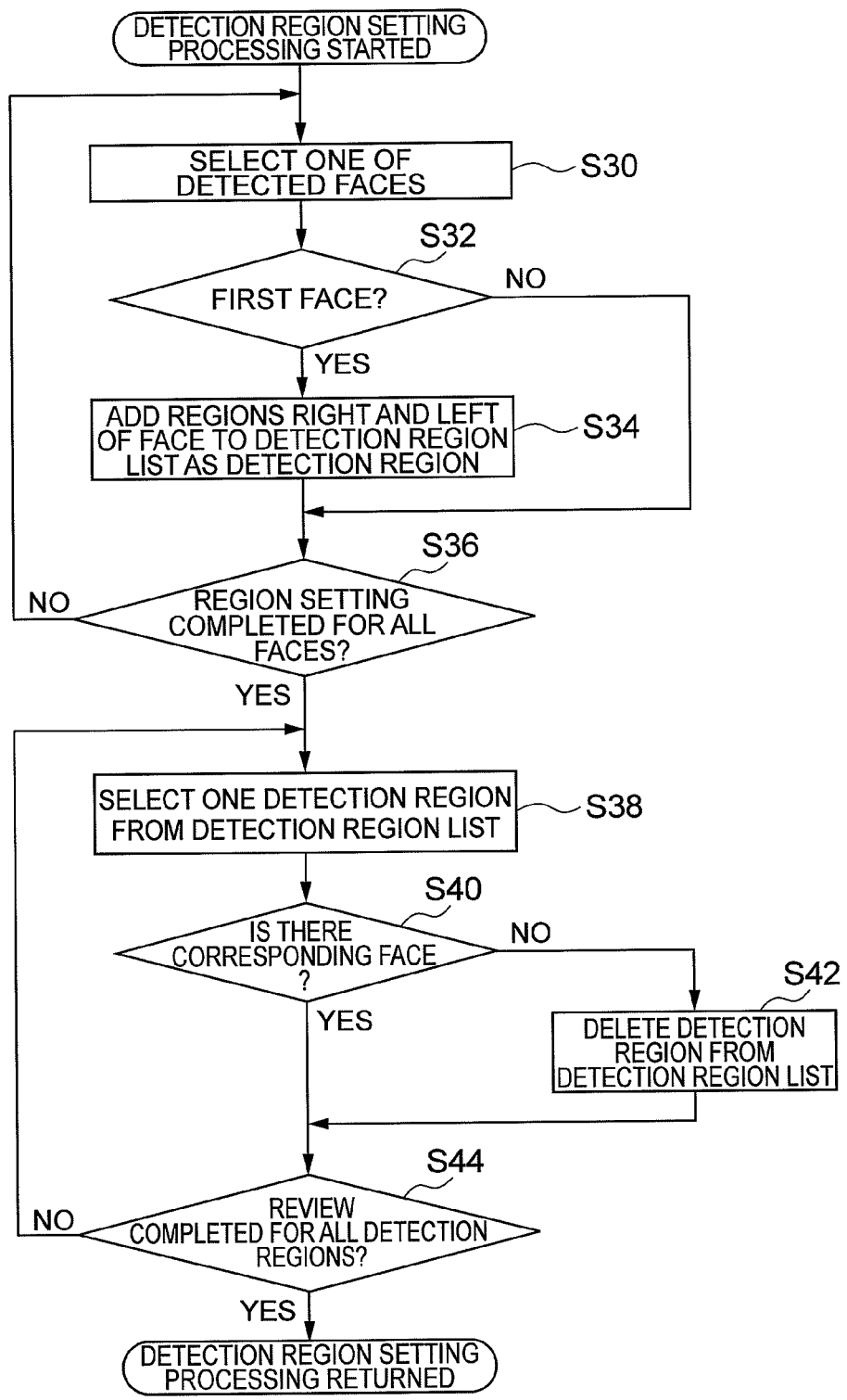
FIG. 4 is a flowchart for explaining a detection region setting operation of the moving object detecting device illustrated in FIG. 1.
Figure 5:
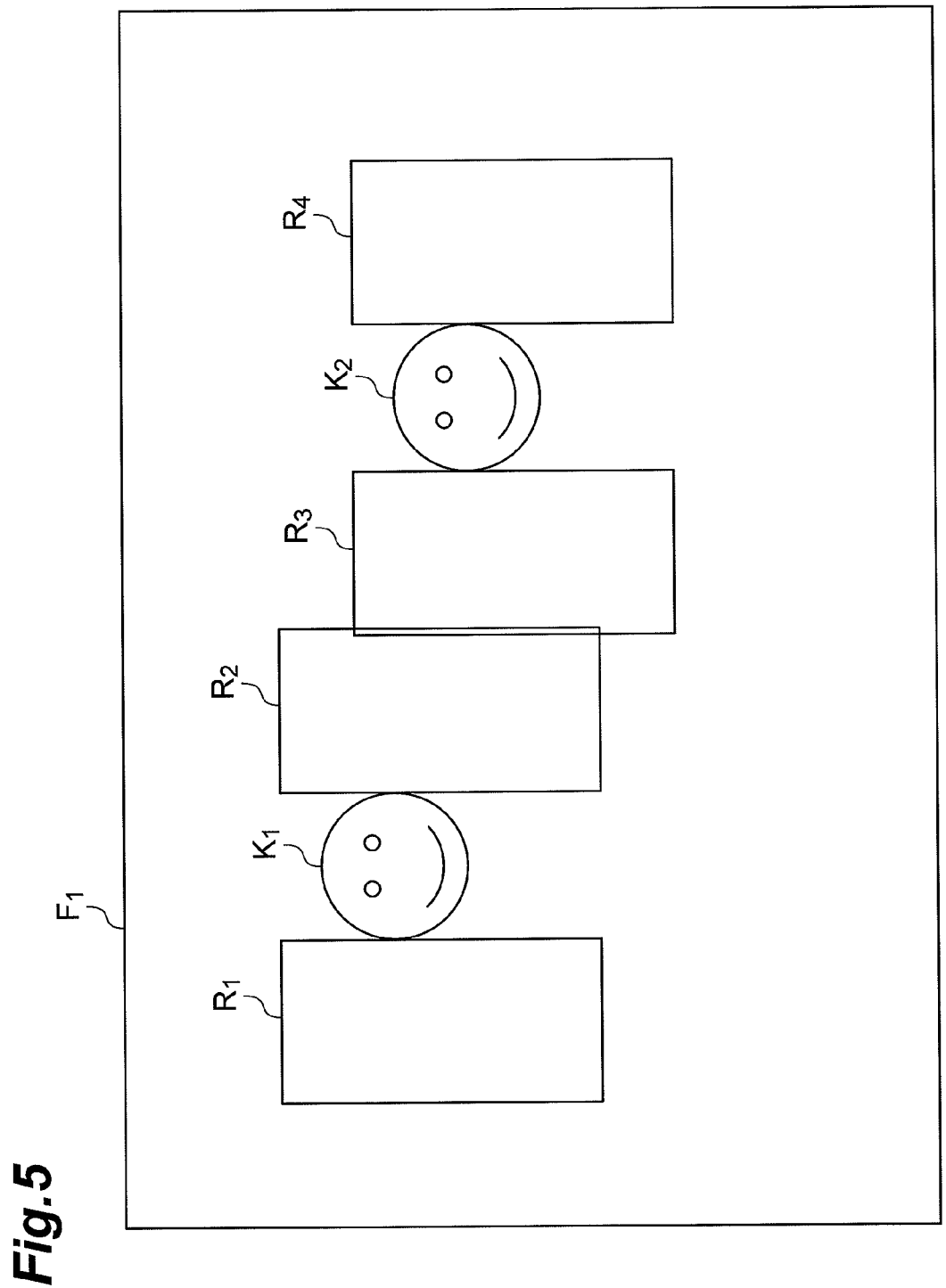
FIG. 5 is an outline diagram for explaining an example of a detection region.

Subsequently, details of each processing in FIG. 3 will be described. First, details of the detection region setting processing (S16) will be described by using FIG. 4. FIG. 4 is a flowchart illustrating the detection region setting operation of the hand detecting device 1 according to this embodiment. Considering ease of understanding of the explanation, the detection region setting operation will be described by referring to FIG. 5. FIG. 5 is an outline diagram for explaining an example of the detection region.

As illustrated in FIG. 4, first, the detection region setting portion 12 selects one face from faces detected in the processing at S14 (S30). For example, as illustrated in FIG. 5, it is assumed that a plurality of faces $K_1$ and $K_2$ is detected in an image frame $F_1$ in the processing at S14. In this case, the detection region setting portion 12 selects the face $K_1$, for example. When the processing at S30 is finished, the routine proceeds to face determination processing (S32).

In the processing at S32, the detection region setting portion 12 determines whether or not the face $K_1$ selected in the processing at S30 is a face selected for the first time. If it is determined in the processing at S32 that the face $K_1$ selected in the processing at S30 is the firstly selected face, the routine proceeds to detection region list addition processing (S34).

In the processing at S34, the detection region setting portion 12 sets a detection region on the basis of the position of the face selected in the processing at S30. For example, as illustrated in FIG. 5, the detection region setting portion 12 sets rectangular regions, each having a predetermined size and adjacent to right and left of the face $K_1$, as detection regions $R_1$ and $R_2$. The positions of the detection regions $R_1$ and $R_2$ are determined relatively from the position and the size of the face $K_1$. The detection region setting portion 12 adds the set detection regions $R_1$ and $R_2$ to the detection region list. When the processing at S34 is finished, the routine proceeds to finish determination processing (S36).

On the other hand, in the processing at S32, if it is determined that the face $K_1$ selected in the processing at S30 is not the firstly selected face, since the detection region has been already set in the past, the routine proceeds to the finish determination processing without addition to the detection region list (S36).

In the processing at S36, the detection region setting portion 12 determines whether or not the setting of a detection region has been executed for all the faces detected in the processing at S14. If it is determined in the processing at S36 that the setting of a detection region has not been executed for all the faces, the routine goes to the processing at S30 again. In the processing at S30, the detection region setting portion 12 selects a new face $K_2$ again. Then, the detection region setting portion 12 executes face determination in the processing at S32 and sets detection regions $R_3$ and $R_4$ in the processing at S32. As described above, the processing at S30 to S36 is repeatedly executed till the setting processing of a detection region is executed for all the faces detected in the processing at S14. On the other hand, in the processing at S36, if it is determined that the setting processing of a detection region has been executed for all the detection regions, the routine proceeds to selection processing of a detection region (S38). In the following processing at S38 to S44, the detection region list is reviewed.

In the processing at S38, the detection region setting portion 12 refers to the detection region list and selects one detection region. When the processing at S38 is finished, the routine proceeds to correspondence determination processing (S40).

In the processing at S40, the detection region setting portion 12 determines whether or not there is a face corresponding to the detection region selected in the processing at S38. In the processing at S40, if it is determined that there is no face corresponding to the detection region, the routine proceeds to deletion processing (842).

In the processing at S42, the detection region setting portion 12 deletes the detection region selected in the processing at S38 from the detection region list. When the processing at S42 is finished, the routine proceeds to the finish determination processing (844).

On the other hand, in the processing at S40, if it is determined that there is a face corresponding to the detection region, the routine proceeds to the finish determination processing without deleting the detection region from the detection region list (844).

In the processing at S44, it is determined whether or not the detection region setting portion 12 has finished review processing for all the detection regions. If it is determined in the processing at S44 that the review processing has not been finished for all the detection regions, the routine goes to the processing at 838 again. As a result, in the processing at S38, the detection region setting portion 12 re-selects a new detection region. Then, the detection region setting portion 12 executes the correspondence determination processing in the processing at 838. As described above, the processing at S38 to S44 is repeatedly executed till the review processing is executed for all the detection regions in the detection region list. On the other hand, in the processing at S44, if it is determined that the review processing has been finished for all the detection regions, the control processing illustrated in FIG. 4 is finished.

The control processing illustrated in FIG. 4 is finished as above. By executing the control processing illustrated in FIG. 4, the detection regions are set on the both sides of the detected face, and the detection region corresponding to the face which is no longer drawn in the image frame can be deleted from the detection region list.

Figure 6:
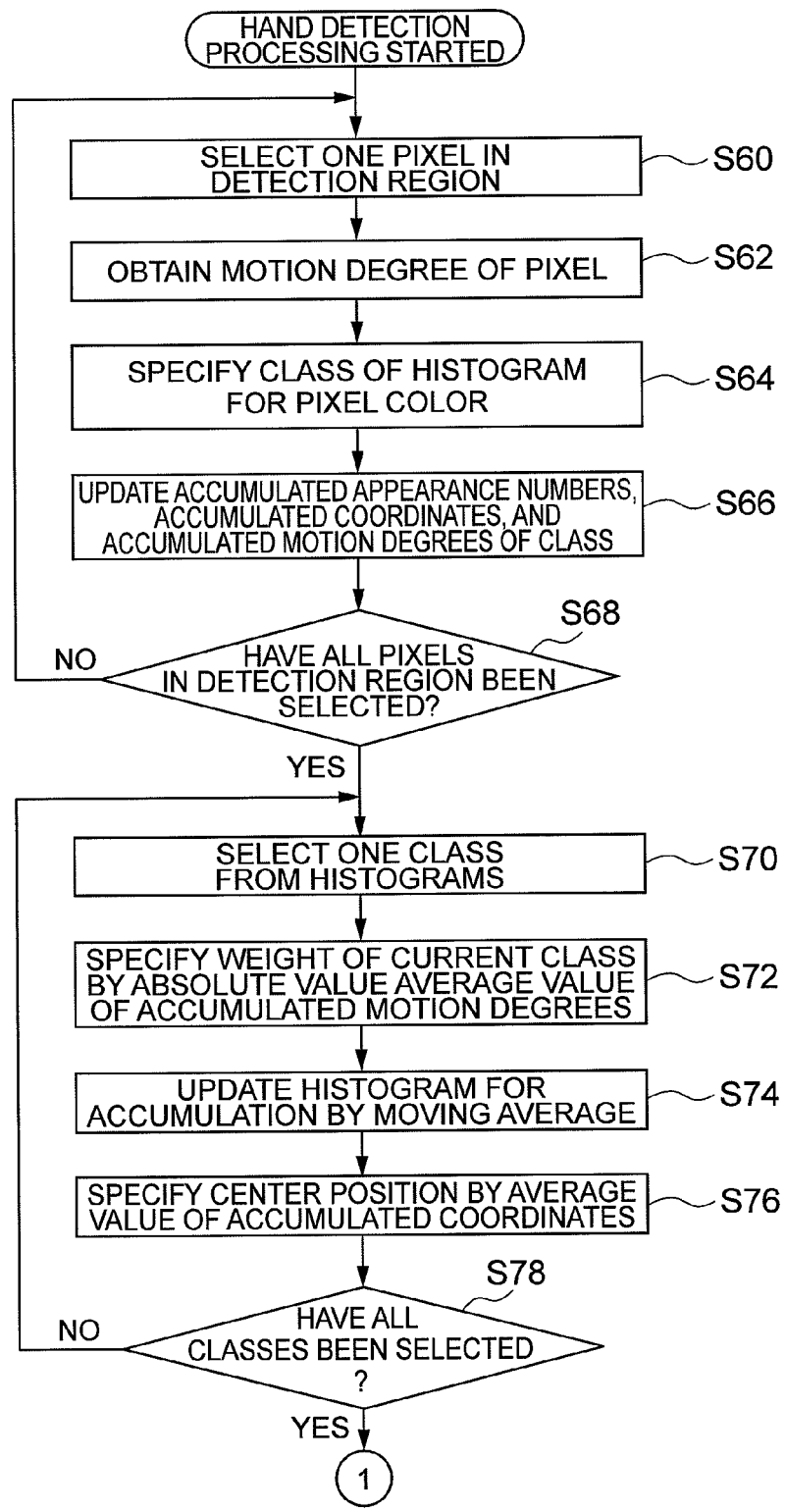
FIG. 6 is a flowchart for explaining a manual detecting operation of the moving object detecting device illustrated in FIG. 1.
Figure 7:
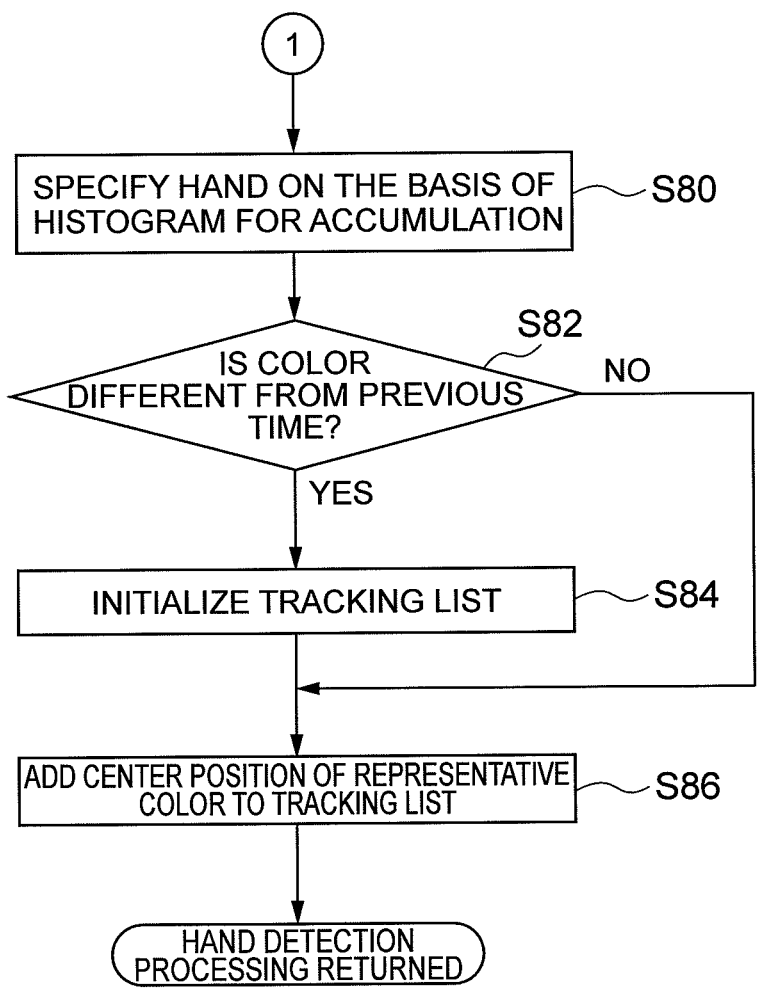
FIG. 7 is a flowchart for explaining a manual detecting operation of the moving object detecting device illustrated in FIG. 1.
Figure 8:
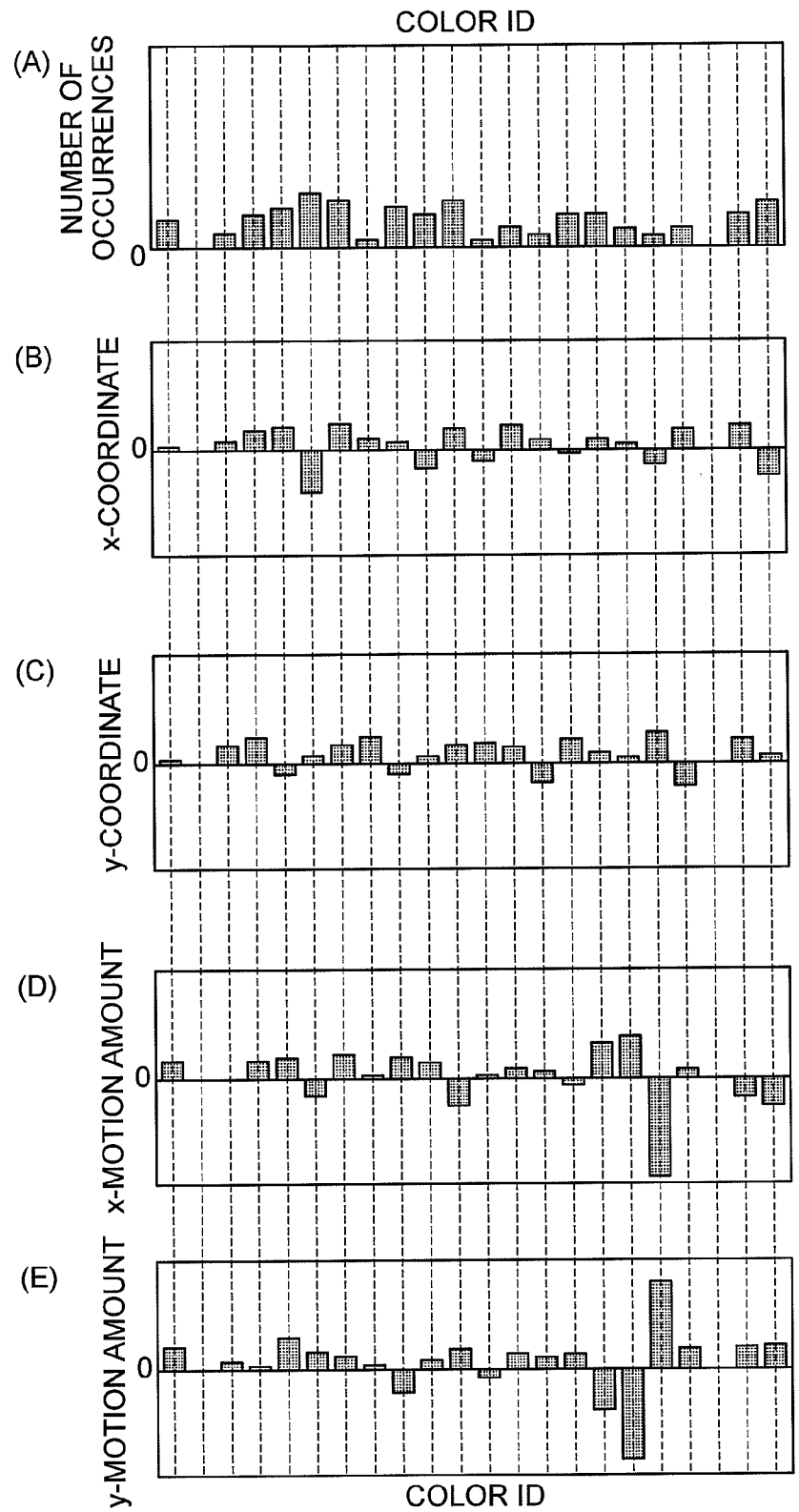
FIG. 8 is an example of histograms indicating frequencies to a color ID in a pixel in the detection region. (A), (B), (C), (D) and (E) show an accumulated number of occurrences, accumulated positional information (x-coordinate), accumulated positional information (y-coordinate), accumulated motion amounts (x-direction), and accumulated motion amounts (y-direction), respectively.
Figure 9:
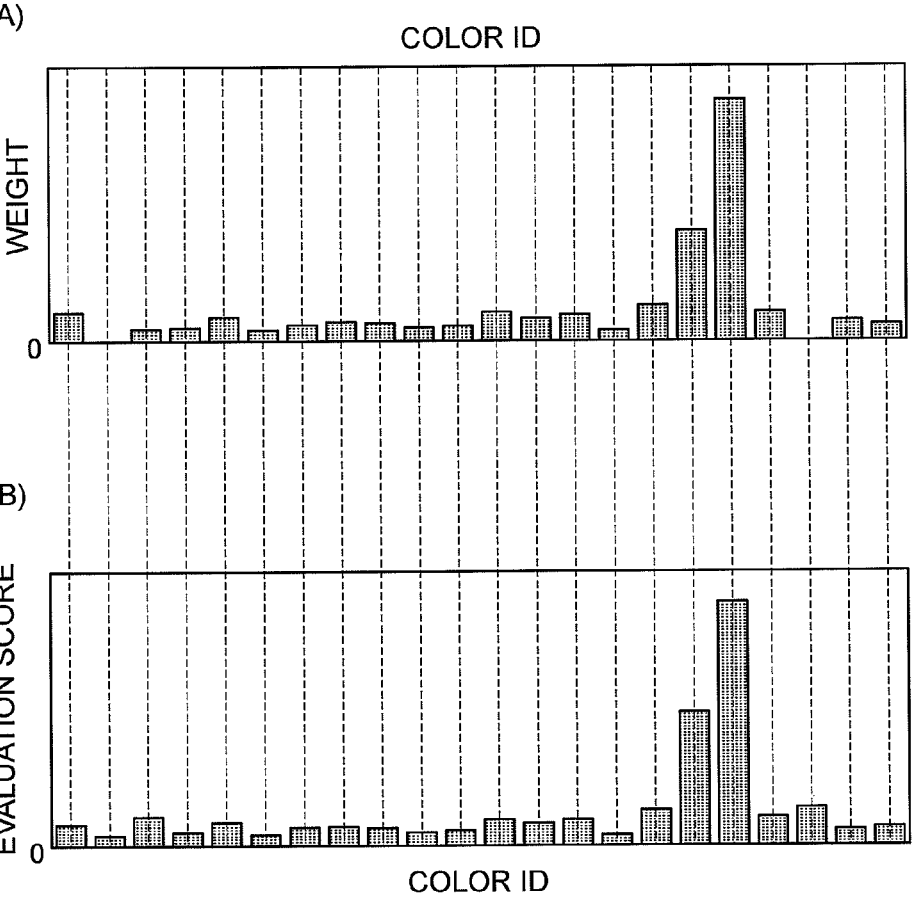
FIG. 9(A) is an example of a histogram indicating an evaluation score to the color ID in an image frame this time.
FIG. 9(B) is a histogram indicating an accumulated evaluation score to the color ID.
Figure 10:
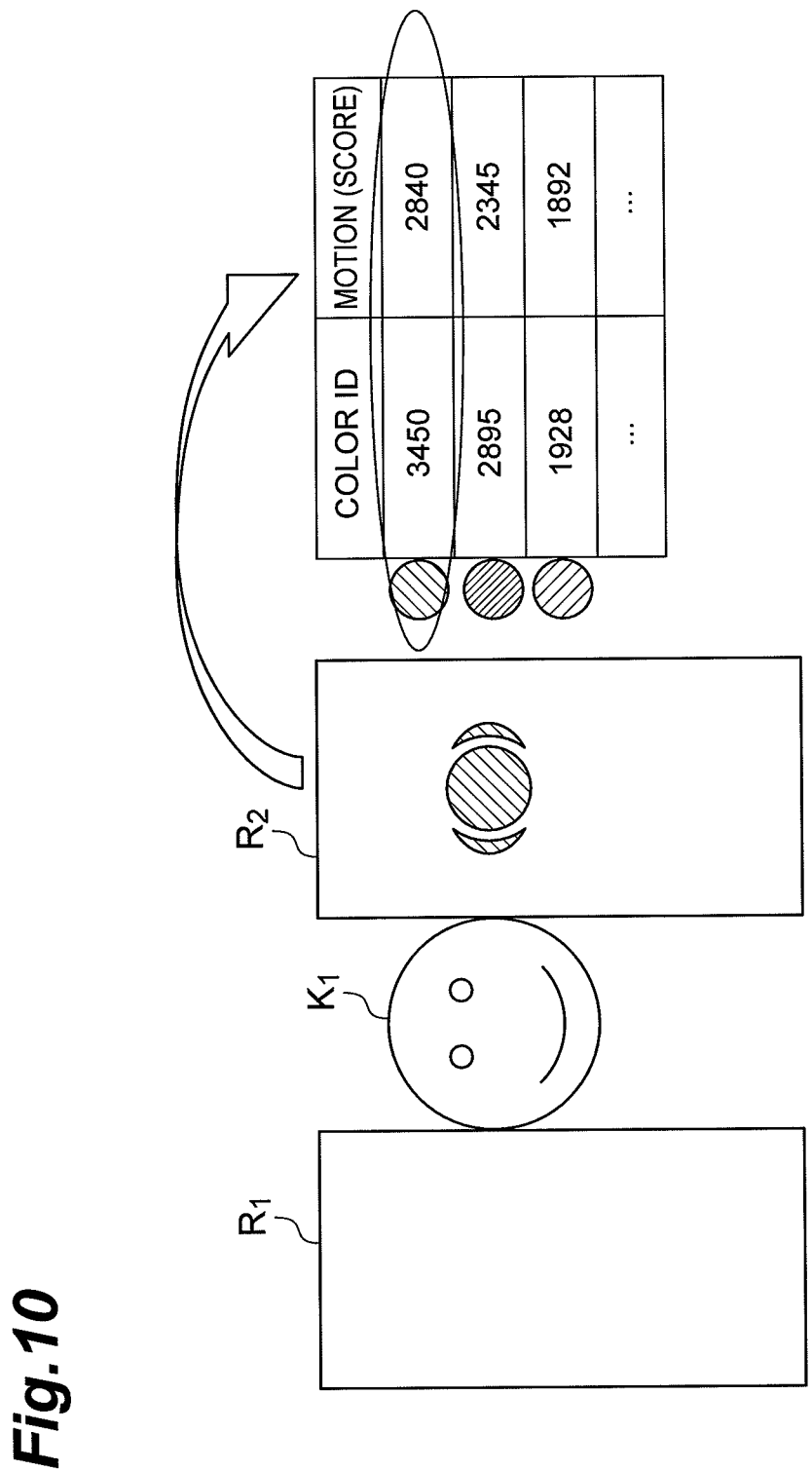
FIG. 10 is an outline diagram for explaining an evaluation score.

Subsequently, details of the hand detection processing (S20) in FIG. 3 will be described. FIGS. 6 and 7 are flowcharts illustrating a hand detection operation of the hand detecting device 1 according to this embodiment. Considering ease of understanding of the explanation, the detection region setting operation will be described by referring to FIGS. 8 to 10. FIG. 8 is an example of histograms indicating frequencies to a color ID in a pixel of a detection region, and (A), (B), (C), (D) and (E) show the accumulated number of occurrences, accumulated positional information (x-coordinate), accumulated positional information (y-coordinate), an accumulated motion amount (accumulated motion degree, x-direction), and an accumulated motion amount (accumulated motion degree, y-direction), respectively. FIG. 9(A) is an example of a histogram indicating weight to the color ID in an image frame this time. FIG. 9(B) is an example of a histogram indicating an accumulated evaluation score to the color ID. In FIGS. 8 and 9, the horizontal axis in each histogram is the same scale, and the color ID is common to all the histograms. FIG. 10 is an outline diagram for explaining the concepts of the color ID and the evaluation score.

As illustrated in FIG. 6, first, the evaluation score calculating portion 14 selects one pixel in the detection region (S60). For example, an upper left pixel in the detection region is selected. When the processing at S60 is finished, the routine proceeds to the motion degree obtainment processing (S62).

In the processing at S62, the motion degree obtaining portion 11 obtains the motion degree of the pixel selected in the processing at S60. The motion degree obtaining portion 11 obtains a motion amount (dx, dy) by the unit of pixel on the basis of the optical flow obtained in the processing at S12 in FIG. 3, for example. When the processing at S62 is finished, the routine proceeds to class specification processing (S64).

In the processing at 864, the color obtaining portion 13 converts the color of the pixel (YUV value, for example) selected in the processing at 860 to a unique color ID. As will be described later, the evaluation score calculating portion 14 prepares a histogram showing the color ID on the horizontal axis (class) as illustrated in (A) to (E) of FIG. 8 and performs calculation. Thus, by converting the color to the color ID, the class of the histogram to which the color ID belongs is specified. When the processing at S64 is finished, the routine proceeds to histogram update processing (866).

In the processing at S66, the evaluation score calculating portion 14 accumulates information of the pixel in the class of the histogram specified in the processing at S64. The evaluation score calculating portion 14 adds one to the class specified in the processing at S64 in the histogram of the number of occurrences illustrated in (A) of FIG. 8 and updates an accumulated occurrence number $X_A$, for example. Also, the evaluation score calculating portion 14 adds the positional information (x, y) of the pixel to the class specified in the processing at S64 in the histogram of the positional information (x, y) illustrated in (B) and (C) of FIG. 8 and updates accumulated positional information $I_x$ and $I_y$, for example. Also, the evaluation score calculating portion 14 adds the motion amount (dx, dy) of the pixel to the class specified in the processing at S64 in the histogram of the motion amount (dx, dy) illustrated in (D) and (E) of FIG. 8 and updates accumulated motion amounts $D_x$ and $D_y$, for example. The information may be smoothened by accumulating the results not only to the histograms of the specified color ID but also to the histograms of the adjacent color IDs. When the processing at S66 is finished, the routine proceeds to the finish determination processing (S68).

In the processing at S68, the evaluation score calculating portion 14 determines whether or not all the pixels in the detection region have been selected. In the processing at S68, if it is determined that not all the pixels in the detection region have been selected, the routine goes to the processing at S60 again. In the processing at S60, the evaluation score calculating portion 14 selects another pixel in the detection region. For example, a pixel at a position shifted to the right by one from the upper left pixel in the detection region is selected. As described above, the processing at S60 to S68 is repeatedly executed till all the pixels in the detection region have been selected. On the other hand, if it is determined in the processing at S68 that all the pixels in the detection region have been selected, the routine proceeds to class selection processing (S70).

In the processing at S70, the evaluation score calculating portion 14 selects one class from the histogram corresponding to the current image frame. For example, one class is selected from the classes of the histograms illustrated in FIG. 8. When the processing at S70 is finished, the routine proceeds to weight determination processing (S72).

In the processing at S72, the evaluation score calculating portion 14 calculates a weight of the class selected in the processing at S70. For example, the evaluation score calculating portion 14 calculates an average value of the absolute values of the accumulated motion amounts $D_x$ and $D_y$ calculated in the processing at S66 and sets it as an evaluation score (weight) of the class selected in the processing at S70. That is, a weight w in a certain color ID is calculated by the following formula 1:

[Formula 1]

$$w = \frac{|D_x| + |D_y|}{X_A} \quad (1)$$

The histogram of the weight w calculated by using the formula 1 is shown in FIG. 9(A). When the processing at S72 is finished, the routine proceeds to accumulation histogram update processing (S74).

In the processing at S74, the evaluation score calculating portion 14 updates the histogram for accumulation on the basis of the weight w calculated in the processing at S72. Here, the histogram for accumulation is a graph indicating the evaluation score corresponding to the color ID and is assumed to store calculation values up to the previous time (the initial values are all 0). For example, the evaluation score calculating portion 14 updates the histogram for accumulation by calculating a moving average of the weight w and the histogram for accumulation. For example, assuming that the evaluation score of the histogram for accumulation for a certain color ID is $H_R$ and a time constant is t, the evaluation score calculating portion 14 performs calculation by using the following formula 2:
[Formula 2]

$$H_R \leftarrow t \cdot H_R + (1-t) \cdot w \quad (2)$$

The histogram for accumulation updated by using the formula 2 is shown in FIG. 9(B). When the processing at S74 is finished, the routine proceeds to center position specification processing (S76).

In the processing at S76, the evaluation score calculating portion 14 estimates the center position of a color. The evaluation score calculating portion 1 estimates the center position $(C_x, C_y)$ of the color on the basis of accumulated positional information $I_x, I_y$ calculated in the processing at S66. For example, the calculation is made by using the following formula 3:

[Formula 3]

$$(C_x, C_y) = \left(\frac{I_x}{X_A}, \frac{I_y}{X_A}\right) \quad (3)$$

When the processing at S76 is finished, the routine proceeds to the finish determination processing (S78).

In the processing at S78, the evaluation score calculating portion 14 determines whether or not selection has been made and processing has been executed for all the classes. In the processing at S78, if ti is determined that the selection has not been made and the processing has not been executed for all the classes, the routine goes to the processing at S70 again. The evaluation score calculating portion 14 selects another class in the processing at S70, specifies the weight in the processing at S72, carries out update by using the moving average in the processing at S74, and specifies the center position in the processing at S76. As described above, if it is determined that selection has not been made and the processing has not been executed for all the classes, the processing at S70 to S78 is repeatedly executed till all the classes are selected. Thus, by repeating the above processing, the weight w illustrated in FIG. 9(A) is reflected in the evaluation score illustrated in FIG. 9(B). On the other hand, in the processing at S78, if it is determined that the processing has been executed for all the classes, the routine proceeds to representative color specification processing (S80 in FIG. 7).

In the processing at S80, the hand detecting portion 15 specifies the hand on the basis of the evaluation score. The more actively the color is moving, the higher the value of the evaluation score becomes. The hand detecting portion 15 detects the portion where the evaluation score is higher than the other portions in the image as the object. For example, the hand detecting portion 15 creates an image having the evaluation score as a brightness value and detects the portion with high brightness as the object. When the processing at S80 is finished, the routine proceeds to color checking processing (S82).

In the processing at S82, the hand detecting portion 15 specifies the representative color of a moving object and determines whether or not the representative color of the specified hand is a color different from the representative color in the image frame the previous time. The hand detecting portion 15 specifies the color ID with the highest value of the evaluation score shown in FIG. 9(B), for example, as the representative color of the hand. For example, if the color ID=3450 has the highest score in the detection region $R_2$ as illustrated in FIG. 10, the color ID is recognized as the representative color of the current hand. In the processing at S82, if it is determined that the representative color of the hand specified in the processing at S80 is not a color different from the representative color in the image frame the previous time, the routine proceeds to trajectory list update processing (S86).

In the processing at S86, the hand detecting portion 15 updates a hand trajectory list. For example, the hand detecting portion 15 obtains the center position $(C_x, C_y)$ calculated in the processing at S76 for the representative color obtained in the processing at S80 and updates a hand trajectory list. When the processing at S86 is finished, the control processing illustrated in FIGS. 6 and 7 is finished.

On the other hand, in the processing at S82, if it is determined that the representative color of the hand specified in the processing at S80 is a color different from the representative color in the image frame the previous time, the routine proceeds to trajectory list initialization processing (S84). In the processing at S84, the hand detecting portion 15 initializes the trajectory list. When the processing at S84 is finished, the routine proceeds to trajectory list update processing (S86).

The control processing illustrated in FIGS. 6 and 7 is finished as above. By executing the control processing illustrated in FIGS. 6 and 7, the portion having an evaluation score higher than the other portions in the detection region is detected as a moving object. Then, the most actively moving color in the detection region is detected as the representative color of the hand, and the center position of the representative color is detected as the position of the hand. Unless the color is changed largely, it is assumed to be the same hand, and the trajectory list is created. As described above, by paying attention to the color of the pixel, the moving hand can be detected. The processing at S62 corresponds to the obtaining step, the processing at S70 to S78 corresponds to the evaluation score calculating step, and the single processing at S80 or the processing combining those at S80 and S86 corresponds to the moving object detecting step.

Subsequently, a hand detection program (moving object detection program) that causes the device (computer) 2 to function as the above hand detecting device 1 will be described.

The hand detection program includes a main module, an input module, and a calculation processing module. The main module is a portion that totally controls image processing. The input module operates the device 2 so as to obtain an input image. The calculation processing module includes a motion degree obtaining module, a detection region setting module, a color obtaining module, an evaluation score calculating module, and a moving object detecting module. The functions realized by executing the main module, the input module, and the calculation processing module are similar to the functions of the image input portion 10, the motion degree obtaining portion 11, the detection region setting portion 12, the color obtaining portion 13, the evaluation score calculating portion 14, and the hand detecting portion 15 of the above-described hand detecting device 1, respectively.

The hand detection program is provided by a storage medium such as a ROM or a semiconductor memory, for example. The hand detection program may be provided as a data signal through a network.

In the hand detecting device 1 according to this embodiment, a motion degree of a pixel between image frames is obtained by the motion degree obtaining portion 11, the color of the pixel included in the image frame is obtained by the color obtaining portion 13, an evaluation score indicating the motion level of the color is calculated by the evaluation score calculating portion 14 on the basis of the motion degree for each color, and the hand, which is a moving object, is detected by the hand detecting portion 15 on the basis of the evaluation score for each color. As described above, by evaluating the motion level of the color, a moving hand is detected. Thus, a hand can be detected without setting information relating to the hand or a background in advance. That is, since it is not necessary to set a specific color as the background color or the color of the hand, flexible handling of color distribution is made possible, and even if lighting is changed, a location is changed or clothes are changed, the representative color of the hand can be detected all the time. Even a hand covered by a glove, for example, can be detected. Thus, detection of a hand can be made extremely stably against an environmental change. Also, even if a still object having a similar color is present other than the hand in the same frame, the moving hand can be accurately detected since the color used for the hand other than the similar color can be set as the representative color. Also, as in the prior-art devices, if the color of the hand is set in advance for detecting the hand, the color of the difference between the background and the hand needs to be large to some degree. On the other hand, in the hand detecting device 1 according to this embodiment, as long as the section (class) of the histogram is different, even if the color of the difference between the hand and the background is small, detection is possible in principle. Also, since it is possible to detect a moving hand from color information without separating the hand from background, processing such as setting of a threshold value for background separation can be made unnecessary. Also, since the hand is detected by the color information and the motion level, detection accuracy does not depend on motion continuity or accuracy. Therefore, a hand with quick movement can be also detected properly.

Also, in the hand detecting device 1 according to this embodiment, the number of pixels in the detection region and the motion degree of the pixel are accumulated by the evaluation score calculating portion 14 for each color ID, and the evaluation score of the color ID is calculated on the basis of the accumulated number of pixels in the detection region and accumulated motion degree. By averaging the accumulated value of the motion degree as above, the evaluation score with high accuracy can be calculated for each color.

Also, in the hand detecting device 1 according to this embodiment, the positional information of the pixel is accumulated by the evaluation score calculating portion 14 for each color ID, and the position of the hand is specified by the hand detecting portion 15 on the basis of the accumulated number of pixels and the accumulated positional information for each color ID. By averaging the accumulated values of the positional information as above, the position of the hand can be specified with accuracy.

Moreover, the hand detecting method (moving object detecting method) and the hand detection program according to this embodiment exerts the same advantages as those of the above-described hand detecting device 1.

(Second Embodiment)

A hand detecting device (moving object detecting device) 3 according to a second embodiment is a device that detects a hand, which is a moving object, and includes a part of the hand detecting device 1 according to the first embodiment as constituent elements. Therefore, mainly differences with the hand detecting device 1 will be described and the explanation duplicated with the first embodiment will be omitted. Also, the moving object detecting device 3 according to this embodiment is not limited by the type of moving objects similarly to the first embodiment. Here, considering ease of understanding of the explanation, an example in which the moving object detecting device detects a moving animal (a rabbit) will be described.

Figure 11:
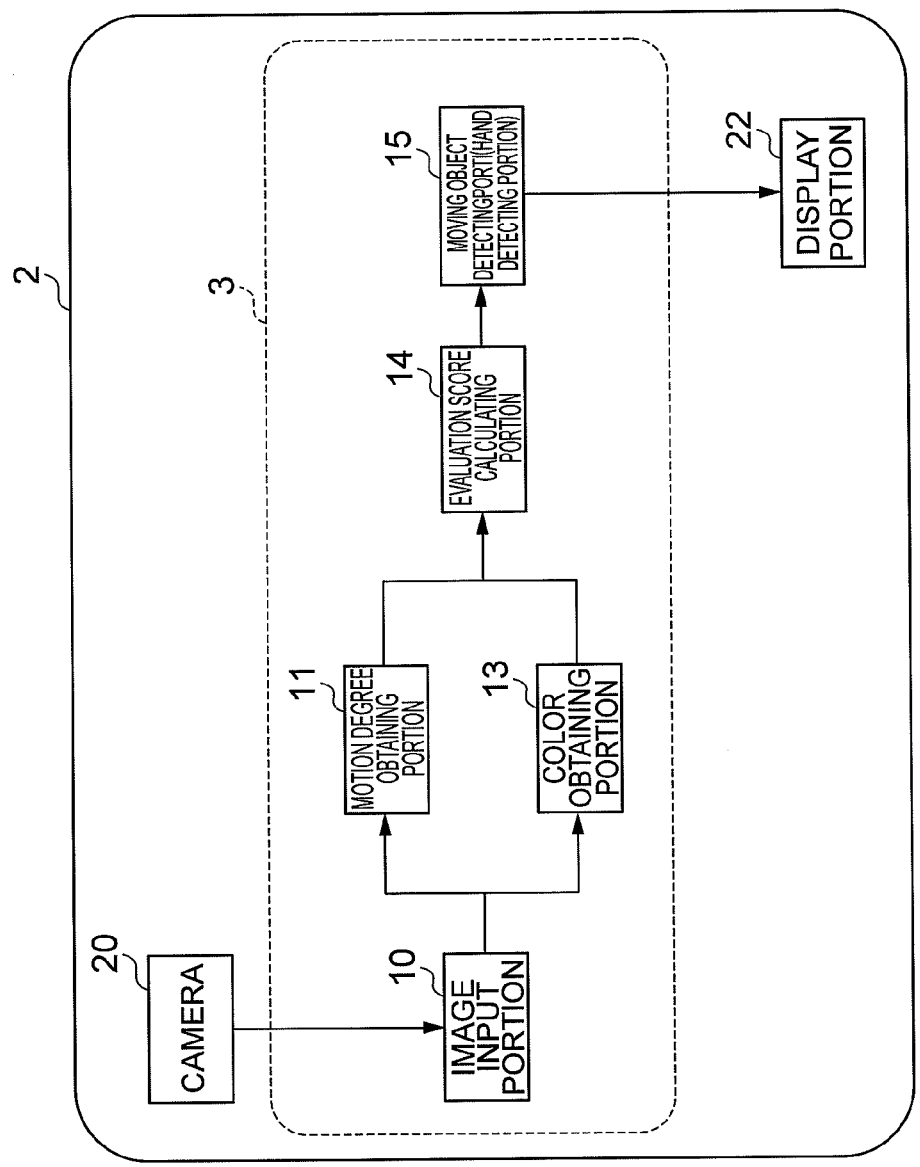
FIG. 11 is a functional block diagram of equipment on which a moving object detecting device according to a second embodiment is mounted.

FIG. 11 is a functional block diagram of the device 2 including the moving object detecting device 3 according to a second embodiment. The device 2 illustrated in FIG. 11 is similar to the contents described in the first embodiment.

As illustrated in FIG. 11, the device 2 includes the camera 20, the moving object detecting device 3, and the display portion 22. The camera 20 and the display portion 22 are similar to the contents described in the first embodiment. The moving object detecting device 3 includes the image input portion 10, the motion degree obtaining portion 11, the color obtaining portion 13, the evaluation score calculating portion 14, and the moving object detecting portion (hand detecting portion) 15. The functions of the image input portion 10, the color obtaining portion 13, and the evaluation score calculating portion 14 are similar to those of the hand detecting device 1 according to the first embodiment. The functions of the motion degree obtaining portion 11 and the moving object detecting portion 15 are partially different from those of the motion degree obtaining portion 11 and the hand detecting portion 15 of the hand detecting device 1 according to the first embodiment.

The motion degree obtaining portion 11 has a function of cancelling the entire motion of the camera 20 and of extracting only local motions. The motion degree obtaining portion 11 acquires motion of the entire image from a motion detection result by the unit of block while detecting a motion by the unit of block, for example. The motion degree obtaining portion 11 calculates the local motion by subtracting the motion of the entire image from the motion detection result by the unit of block.

The moving object detecting portion 15 has a function of creating a likelihood image (first likelihood image) having the evaluation score corresponding to each color in a pixel included in an image frame as the pixel value on the basis of the color ID in each pixel and the evaluation score output by the evaluation score calculating portion 14. Also, the moving object detecting portion 15 has a function of detecting a moving object on the basis of the created likelihood image.

Figure 12:
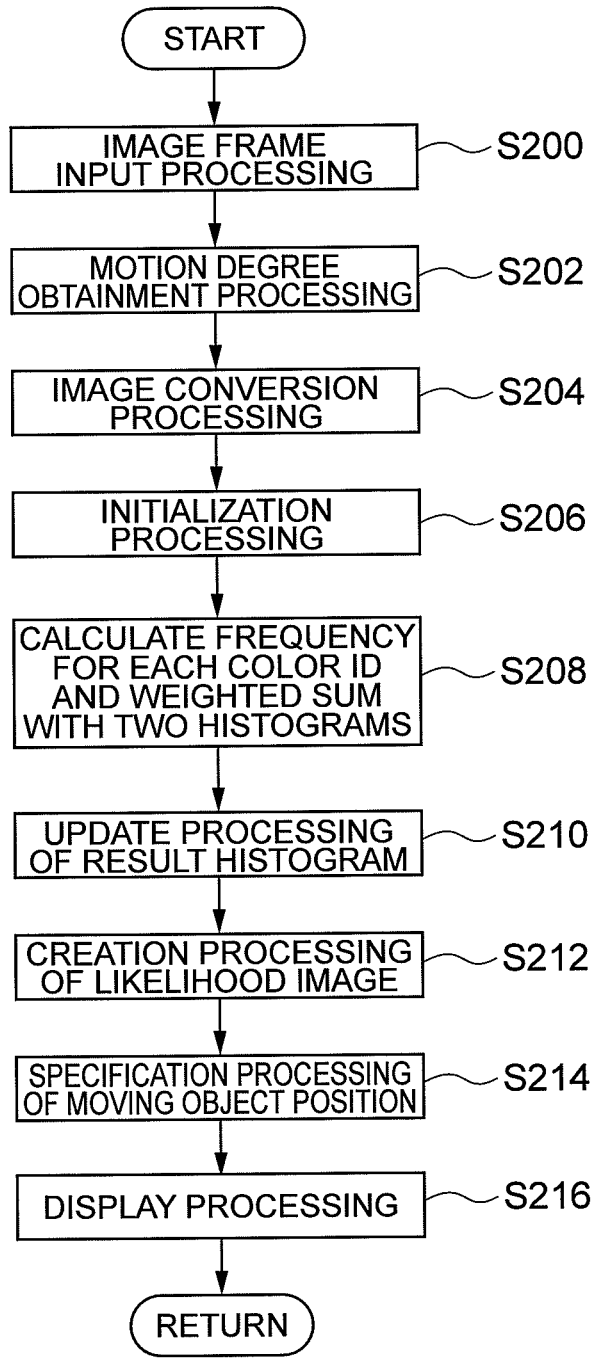
FIG. 12 is a flowchart for explaining a moving object detecting operation of the moving object detecting device illustrated in FIG. 11.

Subsequently, an operation of the hand detecting device 3 according to this embodiment will be described. FIG. 12 is a flowchart for explaining an operation of the hand detecting device 3 according to this embodiment. Control processing illustrated in FIG. 12 is executed at timing when the image pickup function of the device 2 is turned on, for example, and repeatedly executed at a predetermined cycle. Considering ease of understanding of the explanation, the explanation will be made assuming that the hand detecting device 1 has input and recorded a first image frame before execution in FIG. 12. Also, an object to be detected is assumed to be a hand in the explanation.

As illustrated in FIG. 12, first, the image input portion 10 inputs an image frame (second image frame) (S200). When processing at S200 is finished, the routine proceeds to motion degree obtainment processing (S202).

Figure 13:
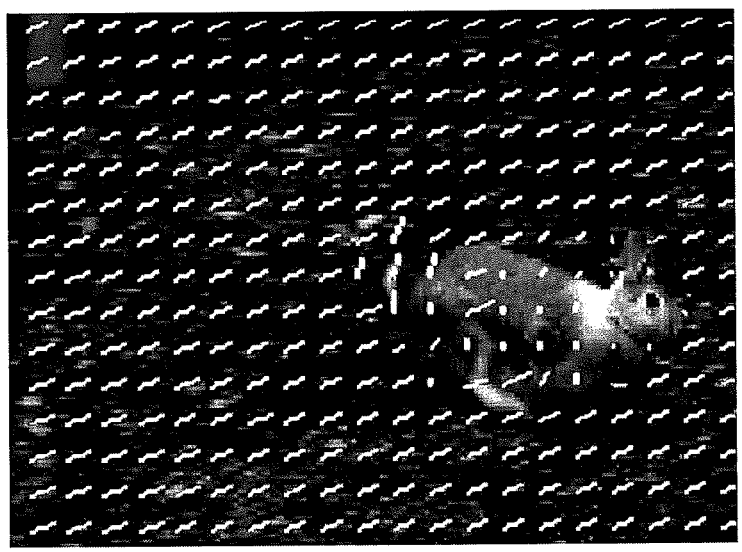
FIGS. 13A and 13B are outline diagrams for explaining a motion degree obtainment processing.
Figure 13:
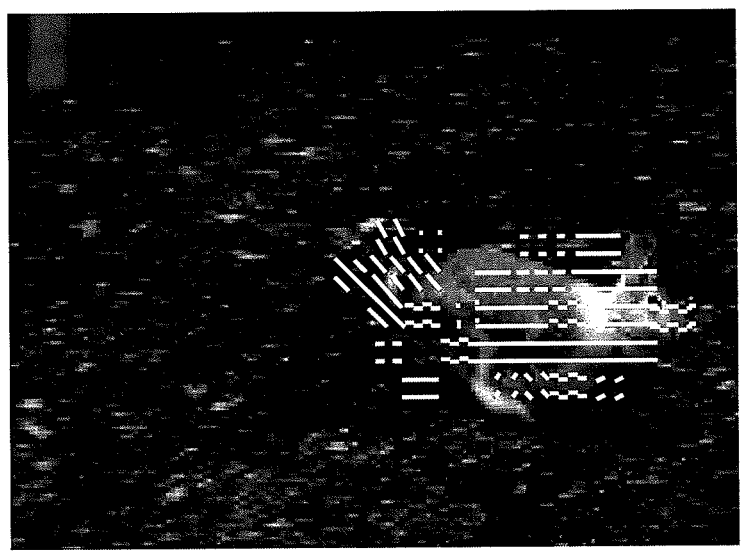

In the processing at S202, the motion degree obtaining portion 11 obtains a motion degree of a pixel in an image frame on the basis of the first image frame and the second image frame. The motion degree obtaining portion 11 cancels the motion of the entire camera 20 and extracts only a local motion. The above processing will be described specifically as follows. First, the motion degree obtaining portion 11 matches the input image frame with the image frame input the previous time by the unit of block at each feature point (20×15 division, 160×120 pixel region, for example). The motion degree obtaining portion 11 obtains the motion by the unit of block through block matching. The motion degree obtaining portion 11 obtains the motion of the entire image frame on the basis of the motion by the unit of block. Then, the motion degree obtaining portion 11 obtains the motion degree from the motion by the unit of block (local motion) without a disturbance element such as a noise by subtracting the motion of the entire image frame from the motion by the unit of block. For example, FIG. 13(A) illustrates a motion by the unit of block, and FIG. 13(B) illustrates a local motion by subtracting the motion of the entire image. When the processing at S202 is finished, the routine proceeds to image conversion processing (S204).

At S204, the color obtaining portion 13 obtains the color of the pixel included in the image frame in association with the positional information (coordinates) and converts it to a unique color ID. For example, the color obtaining portion 13 calculates the color ID obtained by compressing the YUV value (24 bits) to 12 bits similarly to the first embodiment. When the processing at S204 is finished, the routine proceeds to the initialization processing (S206).

At S206, the evaluation score calculating portion 14 executes the initialization processing for calculating the evaluation score for each color ID included in the image frame. The evaluation score calculating portion 14 prepares a result histogram for recording final results and two histograms for accumulation for accumulation calculation. The class of the respective histograms (horizontal axis) is a color ID. The evaluation score calculating portion 14 executes initialization by substituting zero into the values of all the classes in the three prepared histograms. Also, a counter $X_{offset}$ used for keeping the ratio occupied by the region indicating a moving object in the likelihood image constant in the entirety is set to zero. Also, as initial values of the center position $RC_x$, $RC_y$, the width $RS_w$ and the height $RS_h$ of the moving object detection region, the center position of the image and the width and height of the image are substituted. When the processing at S206 is finished, the routine proceeds to accumulation processing (S208).

At S208, the evaluation score calculating portion 14 accumulates the number of pixels and weights for each color ID. The evaluation score calculating portion 14 calculates two histograms for accumulation having the color ID as a class for each frame. The evaluation score calculating portion 14 counts the frequency of each color ID (accumulation of the number of pixels of the same color ID) as a frequency using a first histogram for accumulation. Also, the evaluation score calculating portion 14 counts the weight of each color ID by using the second histogram for accumulation as a frequency. Here, the weight w reflects the motion degree of the pixel and is calculated on the basis of a motion degree $w_1$ of the pixel itself excluding the motion of the entire image, and a motion degree $w_2$ on the basis of the physical positional relationship (position on the basis of the center position ($C_x$, $C_y$) of the image frame, the width $S_x$, the height $S_y$ and the like of the image frame) in the image frame. The evaluation score calculating portion 14 calculates the weight w (x, y) indicating the motion degree of the pixel at certain coordinates (x, y) by using the following formula 4:

[Formula 4]

$$w(x, y) = w_1 + w_2 \qquad (4)$$
$$w_1 = dx \cdot dx + dy \cdot dy$$
$$w_2 = \exp\left(-\frac{(x - C_x)^2}{S_x} - \frac{(y - C_y)^2}{S_y}\right)$$

The evaluation score calculating portion 14 accumulates the weight w(x, y) for each color ID by using the second histogram for accumulation on the basis of the weight w (x, y) of the calculated pixel and the color ID of the pixel. This processing is executed for all the pixels included in the pixel frame. When the processing at S208 is finished, the routine proceeds to result histogram update processing (S210).

At S210, the evaluation score calculating portion 14 updates the result histogram by using the first histogram for accumulation and the second histogram for accumulation. Assuming that the first histogram for accumulation is hist and the second histogram for accumulation is whist, the evaluation score calculating portion 14 updates the result histogram ahist by using the following formula 5:

[Formula 5]

$$ahist[id] \leftarrow \tau \cdot ahist[id] + \frac{(1 - \tau) \cdot whist[id]}{hist[id]} \qquad (5)$$

Here, an id is the color ID (identification number of the class) and an integer is used. Also hist[id], whist[id], and ahist[id] are frequencies of the respective histograms of a certain id. Here, τ is a time constant, and τ=1/64 is employed here as an example. When the processing at S210 is finished, the routine proceeds to likelihood image creation processing (S212).

At S212, the moving object detecting portion 15 creates a likelihood image by using the result histogram ahist obtained in the processing at S210. First, the moving object detecting portion 15 performs threshold value calculation in order to make the ratio occupied by the region (moving object detection region) detected to be a moving object in the likelihood image in the entire image constant. First, the moving object detecting portion 15 sorts the classes in the descending order of the frequencies of the result histograms. Subsequently, the frequencies of the result histograms from the first rank to a predetermined rank s are accumulated as an offset $X_{offset}$. The moving object detecting portion 15 calculates a final offset $SX_{offset}$ by using the following formula 6:
[Formula 6]

$$SX_{offset} \leftarrow \tau \cdot SX_{offset} + (1-\tau) \cdot X_{offset} \quad (6)$$

τ is a time constant, and τ=0.6 is employed here as an example. Subsequently, the hand detecting portion calculates a pixel value of each pixel by using the following formula 7:
[Formula 7]

$$p(x,y) \leftarrow ahist[id] - SX_{offset} \quad (7)$$

Figure 14:
FIGS. 14A and 14B are outline diagrams for explaining a first likelihood image.
Figure 14:
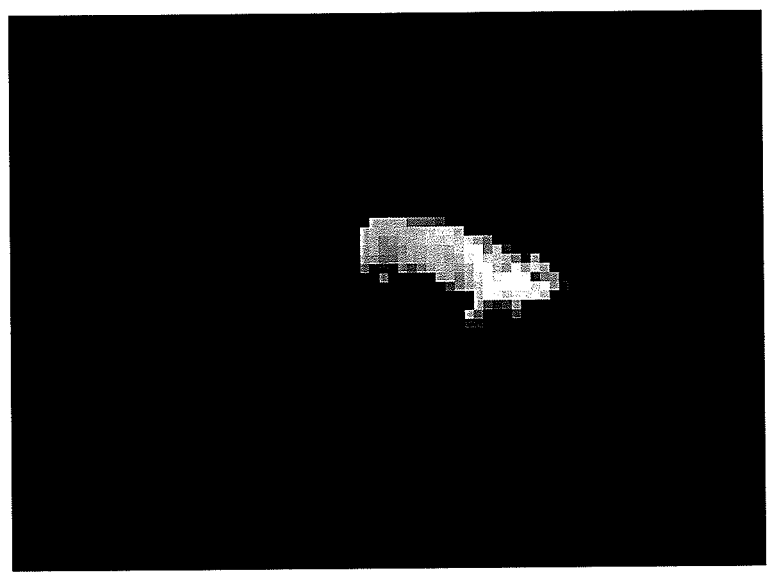

That is, by using the formula 7, the likelihood image can be created having the score (evaluation score) evaluated on the basis of the weight to which the motion degree is reflected and a display frequency as a pixel value. Also, by subtracting the offset $SX_{offset}$, convergence of an object position, which will be described later, is facilitated. FIG. 14A shows a likelihood image before subtraction of the offset $SX_{offset}$, and FIG. 14B is a likelihood image after the subtraction of the offset $SX_{offset}$. In FIG. 14B, contrast between black and white is displayed more clearly than in FIG. 14A. When the processing at S212 is finished, the routine proceeds to moving object position specification processing (S214).

At S214, the moving object detecting portion 15 specifies the position of the moving object by using the likelihood image created in the processing at S212. The moving object detecting portion 15 specifies the size and the position of a rectangle indicating the moving object (moving object detection region) by repeating the following operation several times while updating them. First, the moving object detecting portion 15 calculates a weight pw by using the following formula 8 for the entire image:

[Formula 8]

$$pw = w_1 \cdot w_2 \quad (8)$$
$$w_2 = \exp\left(-\frac{(x-RC_x)^2}{RS_x} - \frac{(y-RC_y)^2}{RS_y}\right)$$

Here, (x, y) is the position of a pixel, $Z_1$ is likelihood of a pixel at the position (x, y), $RC_x$, $RC_y$ is the center position of the moving object detection region, $RS_w$ is the width of the moving object detection region, and $RS_h$ is the height of the moving object detection region.

Subsequently, the moving object detecting portion 15 calculates weighted 0-th moment $m_{00}$, weighted 1st moments $m_{10}$, $m_{01}$, and weighted 2nd moments $m_{20}$, $m_{02}$ in a predetermined pixel of the likelihood image by using the acquired weight pw and accumulates them for all the pixels. The moving object detecting portion 15 performs calculation by using the following formula 9:
[Formula 9]

$$m_{00} \leftarrow m_{00} + pw$$
$$m_{10} \leftarrow m_{10} + pw \cdot x$$
$$m_{01} \leftarrow m_{01} + pw \cdot y$$
$$m_{20} \leftarrow m_{20} + pw \cdot x^2$$
$$m_{02} \leftarrow m_{02} + pw \cdot y^2 \quad (9)$$

Then, the moving object detecting portion 15 updates the center position $RC_x$, $RC_y$, the width $RS_w$, and the height $RS_h$ of the moving object detection region by using the acquired moments. The moving object detecting portion 15 performs calculation by using the following formula 10:

[Formula 10]

$$(RC_x, RC_y) = \left(\frac{m_{10}}{m_{00}}, \frac{m_{01}}{m_{00}}\right) \quad (10)$$

$$RS_w = \sqrt{\frac{m_{20}}{m_{00}} - RC_x^2}$$

$$RS_h = \sqrt{\frac{m_{02}}{m_{00}} - RC_y^2}$$

The moving object detecting portion 15 specifies the moving object position by repeating the above processing several times. When the processing at S214 is finished, the routine proceeds to display processing (S216).

Figure 15:
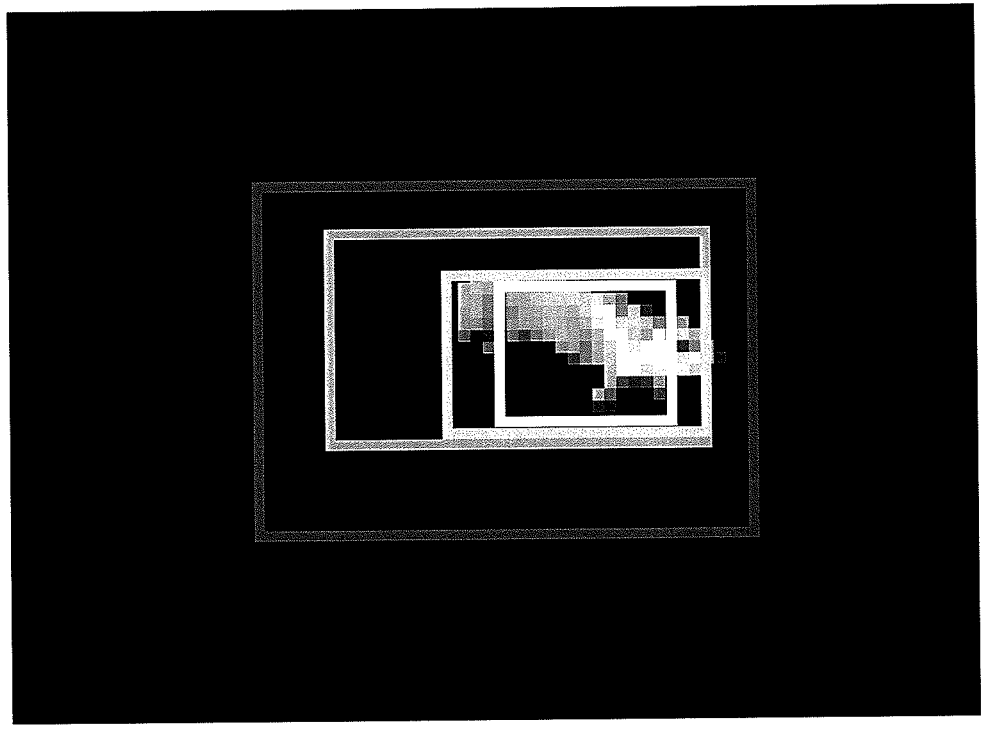
FIG. 15 is an outline diagram for explaining a moving object detection region.

In the processing at S216, the display portion 22 expresses the moving object detection region calculated at S214 by a rectangle or the like and displays it by superimposing it on the image frame. A display example is illustrated in FIG. 15. In FIG. 15, a rectangular region shown in white is displayed several times, the size is contracted every time, and an image converging to the vicinity of the moving object is shown. Along with the convergence, display is sequentially made from an image in dark color to an image in bright color. If a moving object has not been detected in the processing at S202, the display portion 22 displays a usual image frame. When the processing at S216 is finished, the control processing illustrated in FIG. 12 is finished.

The control processing illustrated in FIG. 12 is finished as above. By executing the control processing illustrated in FIG. 12, a portion with an evaluation score higher than those of the other portions in the image frame is detected as a moving object. The processing at S202 corresponds to the obtaining step, and the processing at S204 to S210 corresponds to the evaluation score calculating step, and the processing at S212 and S214 corresponds to the moving object detecting step.

Subsequently, a moving object detection program that causes the device (computer) 2 to function as the moving object detecting device 3 will be described.

The moving object detecting program includes a main module, an input module and a calculation processing module. The main module is a portion that totally controls image processing. The input module operates the device 2 so as to obtain an input image. The calculation processing module includes a motion degree obtaining module, a color obtaining module, an evaluation score calculating module, and a moving object detecting module. The functions realized by executing the main module, the input module, and the calculation processing module are similar to the functions of the image input portion 10, the motion degree obtaining portion 11, the color obtaining portion 13, the evaluation score calculating portion 14, and the hand detecting portion 15 of the above-described hand detecting device 1, respectively.

The moving object detection program is provided by a storage medium such as a ROM or a semiconductor memory, for example. The moving object detection program may also be provided as a data signal through a network.

In the moving object detecting device 3 according to this embodiment, a motion degree of a pixel between image frames is obtained by the motion degree obtaining portion 11, the color of the pixel included in the image frame is obtained by the color obtaining portion 13, an evaluation score indicating the motion level of the color is calculated by the evaluation score calculating portion 14 on the basis of the motion degree for each color, and a moving object is detected by the hand detecting portion 15 on the basis of the evaluation score for each color. As described above, by evaluating the motion level of the color, a moving object is detected. Thus, a moving object can be detected without setting information relating to the moving object or a background in advance. That is, since it is not necessary to set a specific color as the background color or the color of the moving object in advance, flexible handling of color distribution is made possible, and even if lighting is changed, a location is changed or clothes are changed, the moving object can be detected. Thus, detection of a moving object can be made extremely stably against an environmental change. Also, as in the prior-art devices, if the color of the moving object is set in advance for detecting the hand, the color of the difference between the background and the moving object needs to be large to some degree. On the other hand, in the moving object detecting device 3 according to this embodiment, as long as the section (class) of the histogram is different, even if the color of the difference between the background and the moving object is small, detection is possible in principle. Also, since it is possible to detect a moving object from color information without separating the moving object from the background, processing such as setting of a threshold value for background separation can be made unnecessary. Also, since the moving object is detected by the color information and the motion level, detection accuracy does not depend on motion continuity or accuracy. Therefore, a moving object with quick movement can be detected properly. Moreover, even if a target goes out of the frame, only by storing the color information to be focused for a certain period of time, when the target comes into the frame again, its motion can be tracked.

Also, in the hand detecting device 3 according to this embodiment, the motion of the entire image frame is calculated on the basis of the motion by the unit of block, the motion of the entire image frame is subtracted from the motion of the pixel included in the image frame, and the motion degree at each pixel is calculated. By configuring as above, a local motion can be obtained from a difference with the entire motion.

Moreover, the moving object detecting method and the moving object detection program according to this embodiment exert the same advantages as those of the above-described hand detecting device 1.

(Third Embodiment)

A hand tracking device (moving object tracking device) 3 according to a third embodiment is a device that tracks a hand, which is a moving object, and includes the hand detecting device 1 according to the first embodiment or the moving object detecting device 3 according to the second embodiment as a constituent element. Therefore, mainly differences between the hand detecting device 1 and the moving object detecting device 3 will be described, and the explanation duplicated with the first embodiment and the second embodiment will be omitted. Also, the hand tracking device 4 according to this embodiment is not limited to the types of moving objects similarly to the first embodiment. Here, considering ease of understanding of the explanation, an example in which the moving object tracking device tracks a moving hand will be described.

Figure 16:
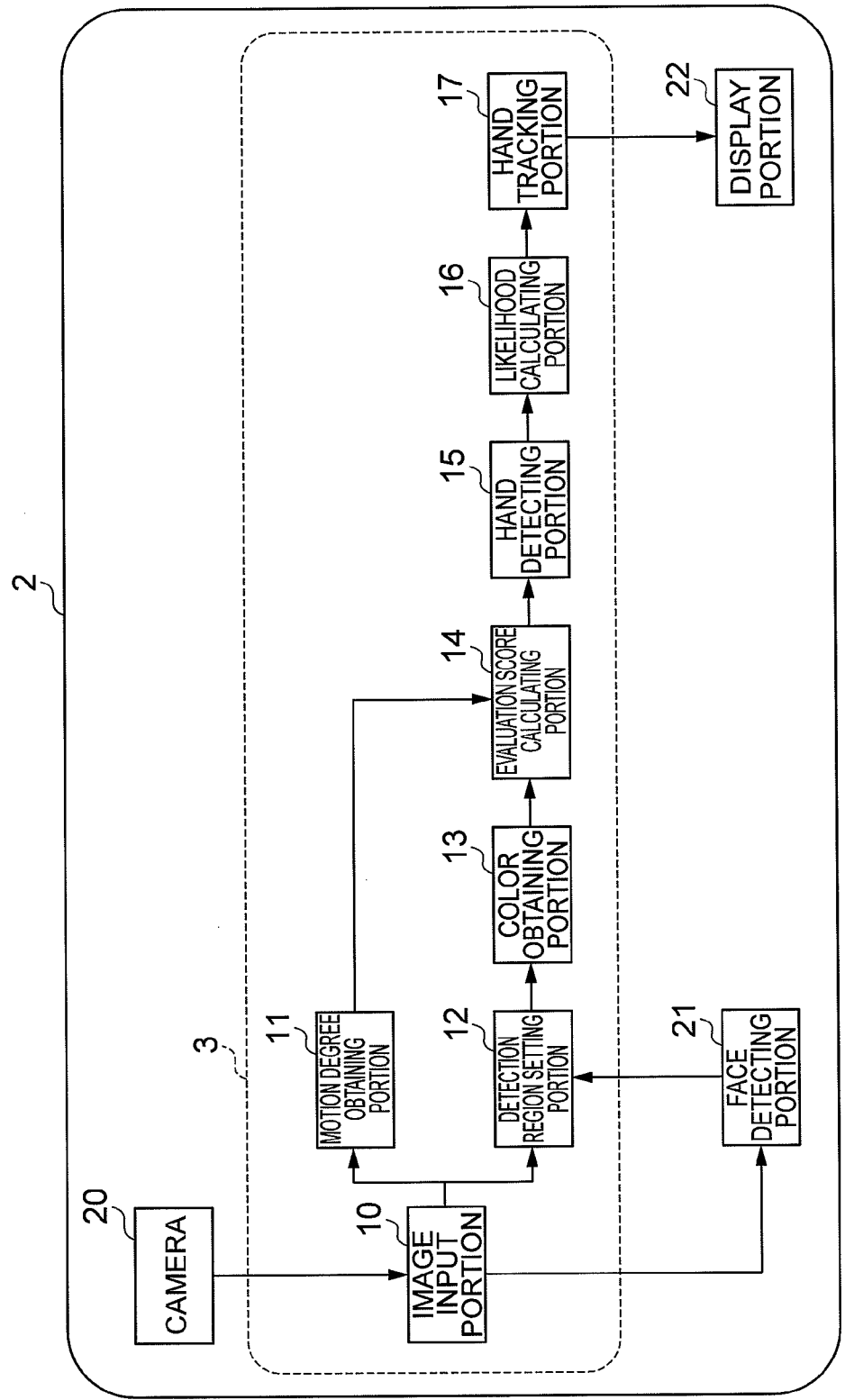
FIG. 16 is a functional block diagram of equipment on which a moving object tracking device according to a third embodiment is mounted.

FIG. 16 is a functional block diagram of the device 2 provided with the hand tracking device 4 according to the third embodiment. The device 2 illustrated in FIG. 16 is similar to the contents described in the first embodiment.

As illustrated in FIG. 16, the device 2 includes the camera 20, the hand tracking device 4, the face detecting portion 21, and the display portion 22. The camera 20, the face detecting portion 21, and the display portion 22 are similar to the contents described in the first embodiment. The hand tracking device 4 includes the image input portion 10, the motion degree obtaining portion 11, the detection region setting portion 12, the color obtaining portion 13, the evaluation score calculating portion 14, the hand detecting portion 15, a likelihood calculating portion (moving object tracking portion) 16, and a hand tracking portion (moving object tracking portion) 17. That is, the hand tracking device 4 is configured by adding the likelihood calculating portion 16 and the hand tracking portion 17 to the hand detecting device 1 according to the first embodiment. A part of the functions of the evaluation score calculating portion 14 is partially different from those of the evaluation score calculating portion 14 of the hand detecting device 1 according to the first embodiment.

The evaluation score calculating portion 14 has a function of counting the number of moving pixels and the number of non-moving pixels for each color ID. For example, the evaluation score calculating portion 14 considers a pixel having a motion degree at a predetermined value or more as a moving pixel and a pixel having a motion degree not more than the predetermined value as a non-moving pixel. The evaluation score calculating portion 14 counts the number of moving pixels as a foreground degree and the number of non-moving pixels as a background degree, for example. The evaluation score calculating portion 14 executes counting during the processing at S66 in FIG. 6.

The likelihood calculating portion 16 has a function of calculating likelihood for each color ID on the basis of similarity of the color to the color of the hand specified by the hand detecting portion 15. The likelihood is a degree that indicates how likely the color is with respect to the tracking target color. The closer the color ID of a target pixel is to the color ID of the hand, the larger the value of the similarity is calculated, for example. Thus, the larger the similarity of the color is, the larger the value of the likelihood is calculated by the likelihood calculating portion 16. Also, the larger the evaluation score of the color is, the more motions the color has. Thus, the larger the evaluation score of the color is, the larger the value of the likelihood is calculated by the likelihood calculating portion 16. Then, the likelihood calculating portion 16 has a function of referring to an output result of the evaluation score calculating portion 14 and reducing the likelihood of the color having the number of foreground pixels smaller than the number of background pixels since it is more likely that they are background pixels. Alternatively, the likelihood calculating portion 16 may set the likelihood of the color having the number of foreground pixels smaller than the number of background pixels to zero. The likelihood calculating portion 16 has a function of outputting the likelihood of each color ID to the hand tracking portion 17.

The hand tracking portion 17 has a function of creating a likelihood image (second likelihood image) having the likelihood of the pixel as a pixel value on the basis of the likelihood of each color ID output by the likelihood calculating portion 16 and the image frame and tracking a hand. The hand tracking portion 17 has a function of reducing the likelihood in the pixel if an inner product of a relative position vector of the pixel on the basis of the position of the hand the previous time and a motion vector of the pixel is negative, since it is less likely that the target is a hand. Alternatively, the hand tracking portion 17 may set the likelihood in the pixel to zero. Moreover, the hand tracking portion 17 has a function of tracking a hand by setting a region smaller than the likelihood image as a tracking rectangle and by moving it so that the center of gravity of the distribution of pixel values in the tracking rectangle of the likelihood image comes to the center of the tracking rectangle. Furthermore, the hand tracking portion 17 has a function of creating a background likelihood image on the basis of the likelihood image of the image frame input the previous time and the tracking rectangle and of tracking a hand by using a difference image between the likelihood image of the image frame and the background likelihood image. The background likelihood image is an image indicating probability that the target is a background. Also, the hand tracking porting 17 has a function of creating an image for background likelihood update for work in order to create a background likelihood image.

The other configurations of the hand tracking device 4 are similar to those of the hand detecting device 1 according to the first embodiment.

Figure 17:
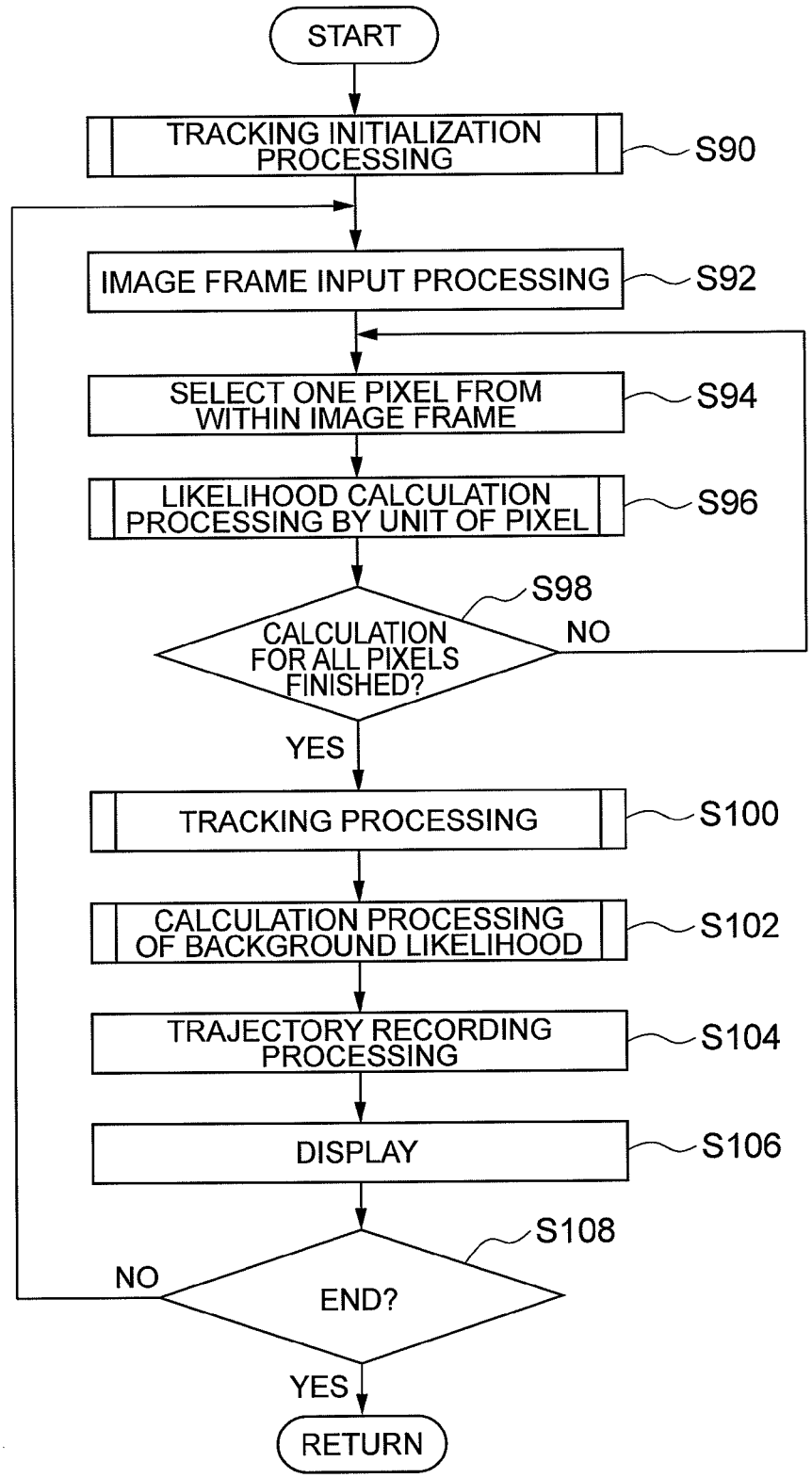
FIG. 17 is a flowchart for explaining an entire operation of the moving object tracking device illustrated in FIG. 16.

Subsequently, an operation of the hand tracking device 4 according to this embodiment will be described. FIG. 17 is a flowchart illustrating the operation of the hand tracking device 4 according to this embodiment. The control processing illustrated in FIG. 17 is executed at timing when the operation of the hand detecting device 1 is finished and repeatedly executed at a predetermined cycle, for example. That is, at start of the processing, it is assumed that the color ID of the moving object has been specified.

As illustrated in FIG. 17, first, the likelihood calculating portion 16 executes tracking initialization processing (S90). The likelihood calculating portion 16 calculates likelihood for each color ID. This processing will be described later. When the processing at S90 is finished, the routine proceeds to image frame input processing (S92).

In the processing at S92, the image input portion 10 inputs a new image frame. When the processing at S92 is finished, the routine proceeds to target pixel selection processing (S94).

In the processing at S94, the likelihood calculating portion 16 selects a pixel which becomes a target for which likelihood is calculated from inside the image frame input in the processing at S92. When the processing at S94 is finished, the routine proceeds to likelihood calculation processing by the unit of pixel (S96).

In the processing at S96, the likelihood calculating portion 16 calculates likelihood for the pixel selected in the processing at S94. Details of this processing will be described later. When the processing at S96 is finished, the routine proceeds to all pixels finish determination processing (S98).

In the processing at S98, the likelihood calculating portion 16 determines whether or not the likelihood of all the pixels in the image frame input in the processing at S92 has been calculated. In the processing at S98, if it is determined that likelihood has not been calculated for all the pixels, the routine goes to the processing at S94 again. The likelihood calculating portion 16 selects a new pixel in the processing at S94 again and calculates the likelihood by the unit of pixel in the processing at S96. As described above, the processing at S94 to S98 is repeatedly executed till the likelihood of all the pixels in the image frame has been calculated. On the other hand, in the processing at S98, if it is determined that likelihood has been calculated for all the pixels in the image frame, the routine proceeds to tracking processing (S100).

In the processing at S100, the hand tracking portion 17 creates a likelihood image on the basis of the likelihood of the pixel calculated in the processing at S98 and detects a moving hand on the basis of the likelihood image. This processing will be described later. When the processing at S100 is finished, the routine proceeds to background likelihood calculation processing (S102).

In the processing at S102, the hand tracking portion 17 calculates background likelihood indicating likelihood of the background on the basis of the likelihood image calculated in the processing at S100. This processing will be described later. When the processing at S102 is finished, the routine proceeds to trajectory recording processing (S104).

The processing at S104 is processing in which the hand tracking portion 17 records a tracking result in the processing at S100 as a trajectory. When the processing at S104 is finished, the routine proceeds to display processing (S106).

In the processing at S106, the display portion 22 superimposes the hand trajectory on the image frame and displays it. When the processing at S106 is finished, the routine proceeds to finish determination processing (S108).

In the processing at S108, the hand tracking portion 17 determines whether or not an input of the image frame has been finished. In the processing at S108, if it is determined that a new image frame has been input, the routine goes to the processing at S92. As a result, the processing at S92 to S108 is repeatedly executed till an input of an image frame has been finished. On the other hand, in the processing at S108, if it is determined that a new image frame has not been input, the control processing illustrated in FIG. 17 is finished.

As described above, the control processing illustrated in FIG. 17 is finished. As illustrated in FIG. 17, the hand tracking device 4 according to this embodiment tracks the hand drawn in the input image frame on the basis of the color of the hand detected by the hand detecting device 1 according to the first embodiment. The processing at S96 corresponds to the likelihood calculating step, and the processing at 8100 corresponds to the moving object tracking step.

Figure 18:
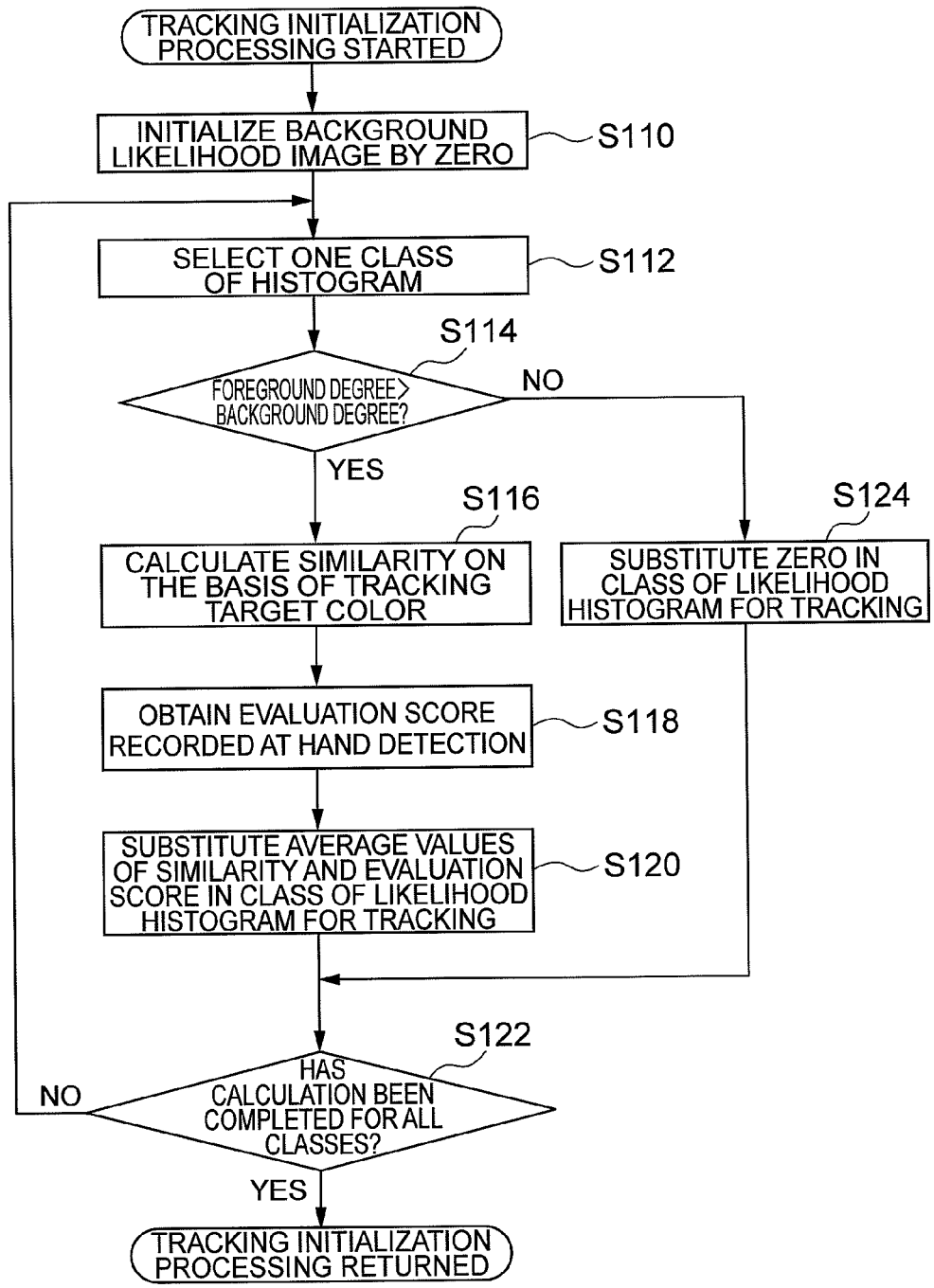
FIG. 18 is a flowchart for explaining an initialization operation of the moving object tracking device illustrated in FIG. 16.
Figure 19:
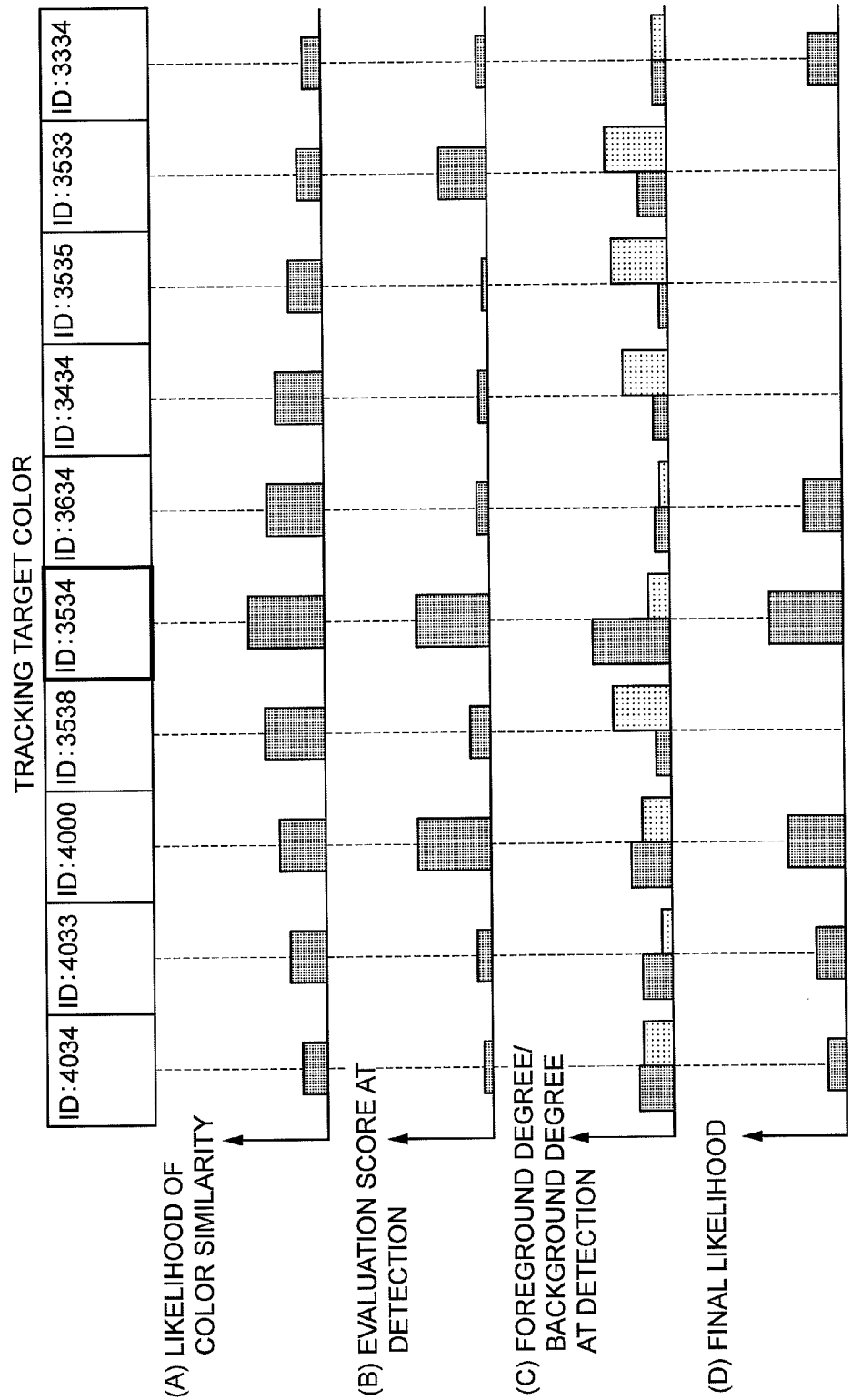
FIG. 19 is an example of likelihood histograms for tracking indicating frequencies to the color ID. (A), (B), (C) and (D) show likelihood of color similarity, evaluation scores at detection, foreground degrees and background degrees, and final likelihood, respectively.

Subsequently, details of each processing in FIG. 17 will be described. First, the details of the tracking initialization processing (S90) will be described by using FIG. 18. FIG. 18 is a flowchart illustrating the tracking initialization operation of the hand tracking device 4 according to this embodiment. Considering ease of understanding of the explanation, the tracking initialization operation will be described by referring to FIG. 19. FIG. 19 is an example of likelihood histograms for tracking indicating degrees with respect to the color ID, in which (A), (B), (C) and (D) show likelihood of color similarity, evaluation scores at detection, foreground degrees and background degrees, and final likelihood, respectively.

As illustrated in FIG. 18, first, the likelihood calculating portion 16 initializes the background likelihood image by zero (S110). The background likelihood image is an image used in the tracking processing, which will be described later. When the processing at S110 is finished, the routine proceeds to class selection processing (S112).

In the processing at S112, the likelihood calculating portion 16 selects one class from the histograms of the color IDs.

Details of this processing will be described by using FIG. 19. In FIG. 19, similarly to the histograms used by the hand detecting device 1 of the first embodiment, the horizontal axis indicates the histogram of the color ID. Here, as an example, there are assumed to be ten color IDs (that is, ten classes). The likelihood calculating portion 16 selects one color ID from the ten color IDs. When the processing at S112 is finished, the routine proceeds to background probability determination processing (S114).

In the processing at S114, the likelihood calculating portion 16 refers to the foreground degree and the background degree counted by the evaluation score calculating portion 14 and determines whether or not the foreground degree of the color ID selected in the processing at S112 is larger than the background degree. For example, at hand detection, it is assumed that the evaluation score calculating portion 14 counts the foreground degree and the background degree as illustrated in (C) of FIG. 19. In this case, if the selected color ID is a color ID 4000 illustrated in FIG. 19, the likelihood calculating portion 16 determines that the foreground degree is larger than the background degree. In the processing at S114, if it is determined that the foreground degree is larger than the background degree, since it is less likely that the color ID is the background, the routine proceeds to similarity calculation processing (S116).

In the processing at S116, the likelihood calculation portion 16 calculates to what degree the color ID selected in the processing at S112 is visually similar to the color (representative color) of the hand as similarity. For example, it is assumed that the color of the hand is a color ID 3534 as illustrated in FIG. 19 and the color is the tracking target color. In this case, as illustrated in (A) of FIG. 19, the likelihood calculation portion 16 calculates similarity such that the farther it is from the color ID of the tracking target color ID as a peak, the smaller the similarity becomes. In (A) of FIG. 19, the similarity of all the color IDs are shown for convenience, but in the processing at S116, only the similarity of the color ID selected in the processing at S112 is calculated. When the processing at S116 is finished, routine proceeds to the evaluation score obtainment processing (S118).

In the processing at S118, the likelihood calculating portion 16 obtains the evaluation score at detection of the color of the hand. For example, the likelihood calculating portion 16 refers to the evaluation score output by the evaluation score calculating portion 14. As a result, as illustrated in (B) of FIG. 19, for example, the evaluation scores at hand detection can be obtained. (B) of FIG. 19 shows evaluation scores of all the color IDs for convenience, but in the processing at S118, only the evaluation score of the color ID selected in the processing at S112 is obtained. When the processing at S118 is finished, the routine proceeds to final likelihood setting processing (S120).

In the processing at S120, the likelihood calculating portion 16 determines the final likelihood of the color ID on the basis of the similarity calculated in the processing at S116 and the evaluation score obtained in the processing at S118. For example, a weighted average value of the similarity and the evaluation score is assumed to be the final likelihood of the color ID. As a result, as illustrated in (D) of FIG. 19, for example, the final likelihood can be obtained. In (D) of FIG. 19, the final likelihood of all the color IDs is shown for convenience, but only the evaluation score of the color ID selected in the processing at S112 is obtained in the processing at S120. When the processing at S120 is finished, the routine proceeds to final class checking processing (S122).

On the other hand, in the case of S114, the likelihood calculating portion 16 determines that if the selected color ID is the color ID 3434 illustrated in FIG. 19, for example, the foreground degree is not larger than the background degree. In this case, it is more likely that the color ID is the background. Thus, the routine proceeds to background processing (S124). In the processing at S124, the likelihood calculating portion 16 sets the likelihood of the histogram of the color ID to zero. For example, as illustrated in (D) of FIG. 19, the final likelihood of the color ID 3434 is set to zero. When the processing at S124 is finished, the routine proceeds to the final class checking processing (S122).

In the processing at S122, the likelihood calculating portion 16 determines whether or not the likelihood has been calculated for all the classes. In the processing at S122, if it is determined that calculation has not been finished for all the classes, the routine goes to the processing at S112. As a result, the processing at S112 to S124 is repeatedly executed till the calculation of the likelihood has been finished for all the classes. On the other hand, in the processing at S122, if it is determined that the calculation for all the classes has been finished, the control processing illustrated in FIG. 18 is finished.

The control processing illustrated in FIG. 18 is finished as above. By executing the control processing illustrated in FIG. 18, the histograms for tracking ((D) of FIG. 19, for example) are created.

Figure 20:
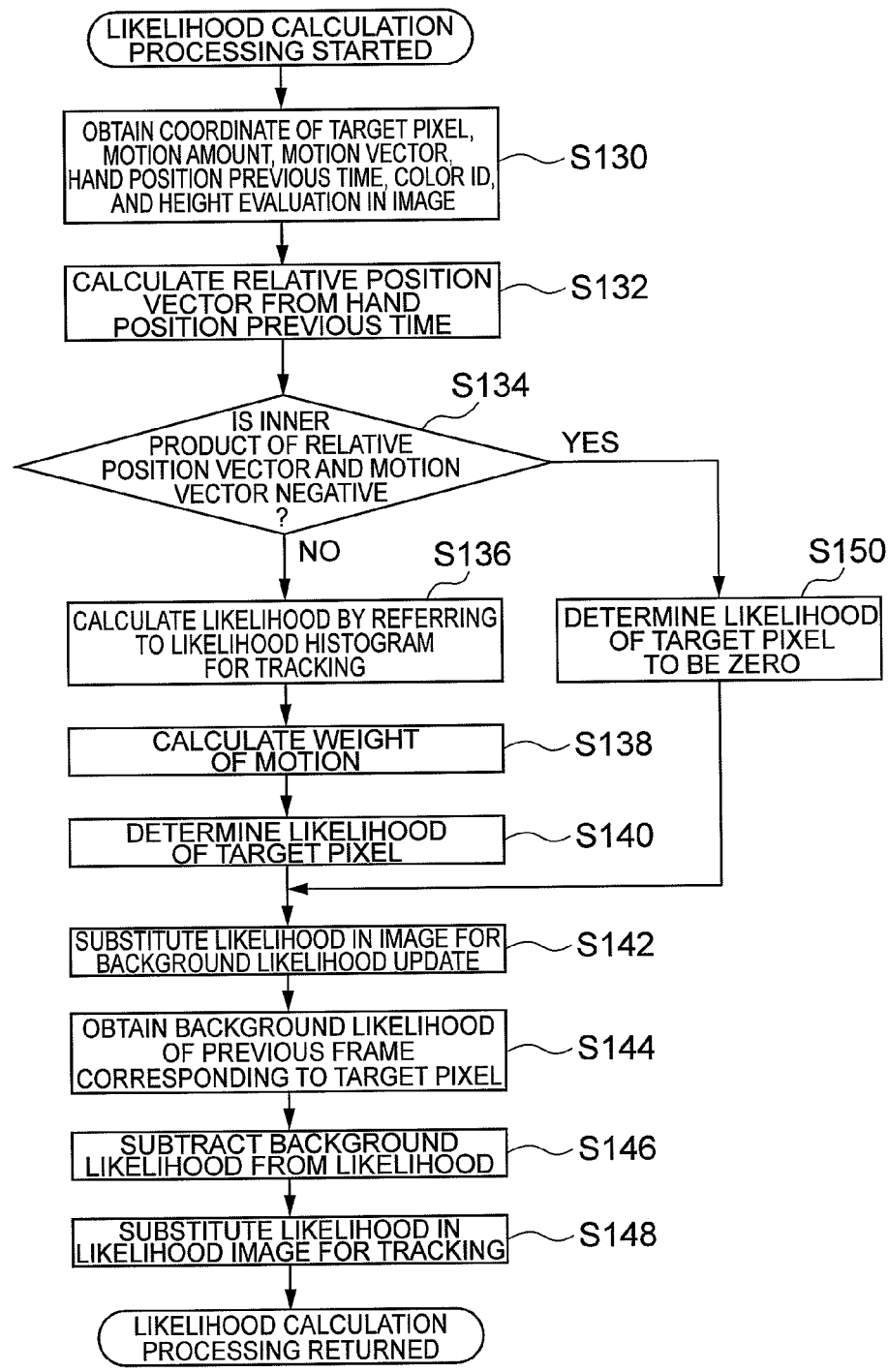
FIG. 20 is a flowchart for explaining a likelihood calculation operation of the moving object tracking device illustrated in FIG. 16.
Figure 21:
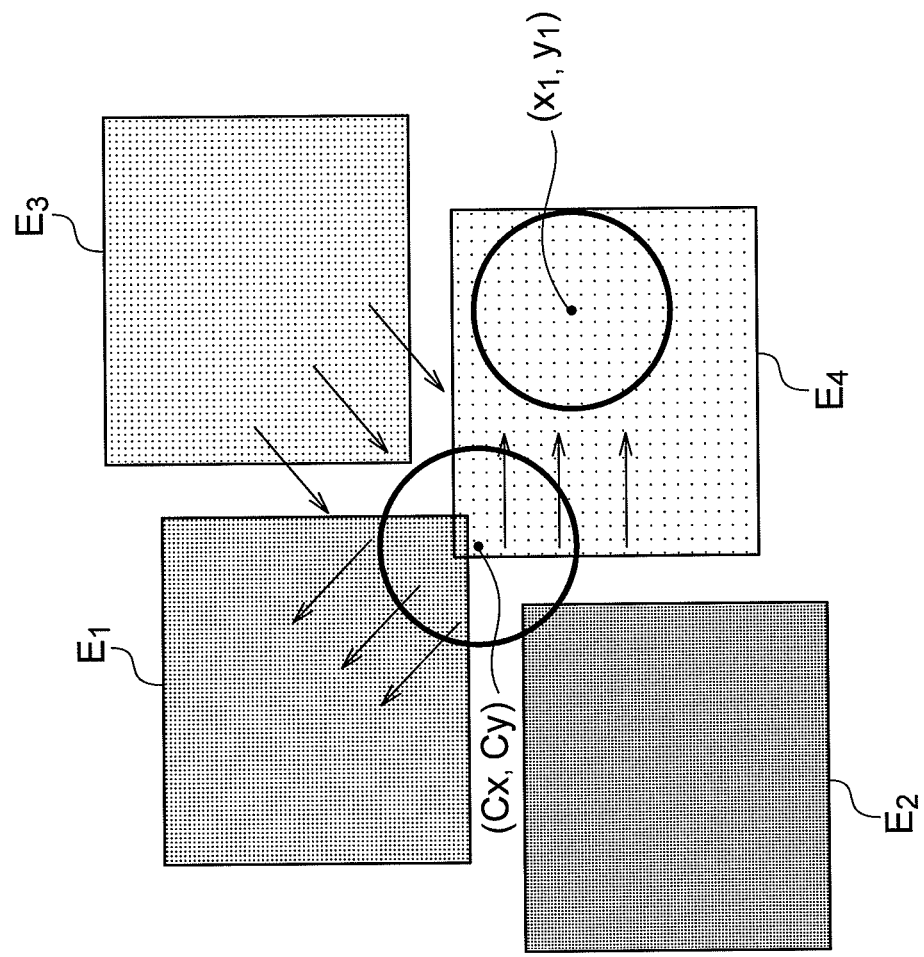
FIG. 21 is an outline diagram for explaining likelihood calculation by using an optical flow in moving-object tracking.
Figure 22:
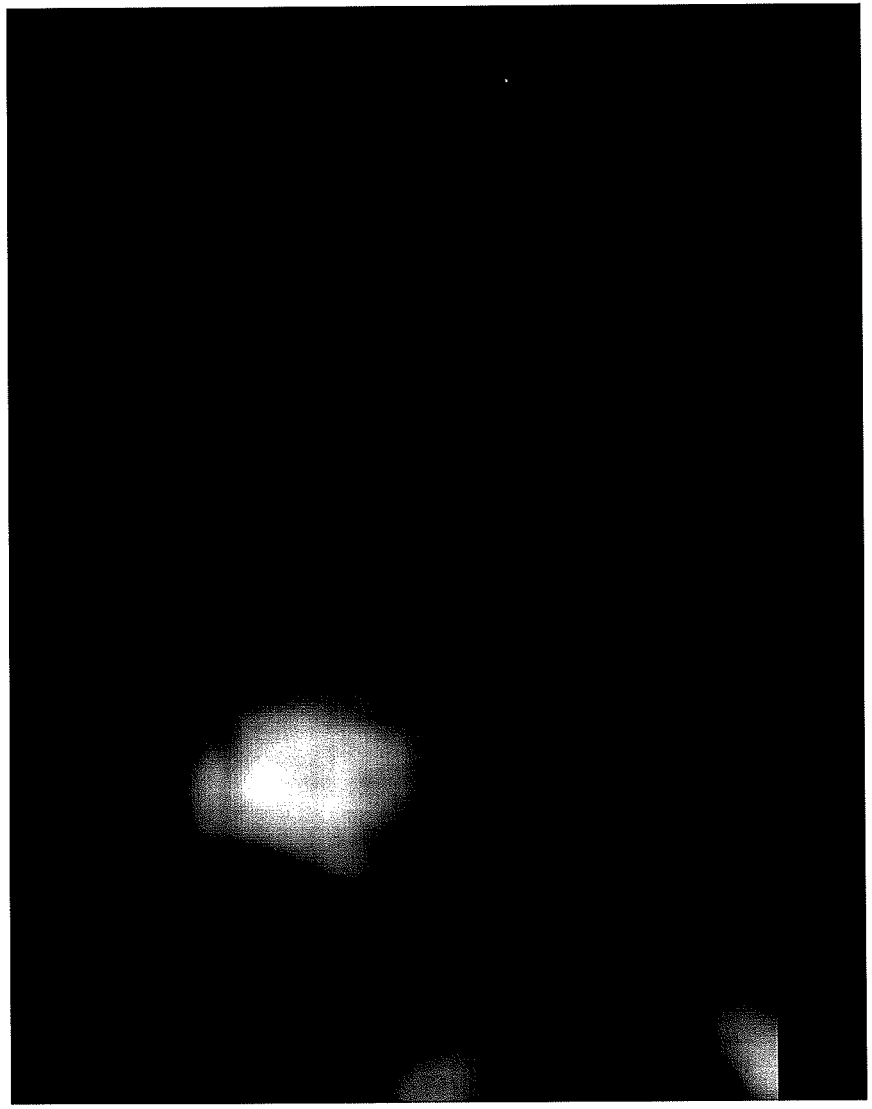
FIG. 22 is an example of a second likelihood image.

Subsequently, details of the likelihood calculation processing (S96) by the unit of pixel in FIG. 17 will be described. FIG. 20 is a flowchart illustrating a likelihood calculation operation of the hand tracking device 4 according to this embodiment. Considering ease of understanding of the explanation, the likelihood calculation operation will be described by referring to FIGS. 21 and 17. FIG. 21 is an outline diagram for explaining the likelihood calculation by using the optical flow in moving object tracking. FIG. 22 is an example of a likelihood image.

As illustrated in FIG. 20, the hand tracking portion 17 obtains information of a target pixel in an input image frame (S130). The hand tracking portion 17 obtains the coordinates of the target pixel (x, y), a motion amount of the target pixel (dx, dy), a motion vector (optical flow) of the target pixel, the center position ($C_x$, $C_y$) of the hand the previous time and the color ID. Moreover, the hand tracking portion 17 evaluates the position in the height direction of the target pixel. Since it is highly probable that a gesturing hand is located above the wrist or the arm, likelihood to be a hand can be weighed by using the y coordinate. For example, assuming that the height in the y direction of the input image frame is $I_H$ and the evaluation value is yw, the hand tracking portion 17 evaluates the position in the height direction of the target pixel by using the following formula 11:

[Formula 11]

$$yw = 1 + \frac{I_H - y}{I_H} \quad (11)$$

The smaller the y coordinate is, the higher the evaluation value yw becomes. When the processing at S130 is finished, the routine proceeds to relative position vector calculation processing (S132).

In the processing at S132, the hand tracking portion 17 calculates a relative position vector from the center position of the hand the previous time to the position of the target pixel. The hand tracking portion 17 calculates the relative position vector on the basis of the center position ($C_x$, $C_y$) obtained in the processing at S130 and the coordinates (x, y) of the target pixel. When the processing at S132 is finished, the routine proceeds to inner product determination processing (S134).

In the processing at S134, the hand tracking portion 17 calculates an inner product of the relative position vector calculated in the processing at S132 and the motion vector (optical flow) obtained in the processing at S130. Details of this processing will be described by using FIG. 21. FIG. 21 illustrates the center position ($C_x$, $C_y$) of the hand the previous time and the coordinates ($x_1$, $y_1$) of the target pixel. Arrows in the figures are optical flows. It is assumed that in regions $E_1$, $E_3$, and $E_4$, the optical flows are detected and the optical flow is not detected in the region $E_2$. Since a motion is basically detected in the region where the optical flow is detected, likelihood is added. Also, if the direction of the relative position vector of the target pixel on the basis of the center position ($C_x$, $C_y$) of the hand the previous time is opposite the direction of the optical flow, it is less likely that the pixel indicates a moving hand. For example, as illustrated in the figures, if the coordinates ($x_1$, $y_1$) of the target pixel is present in the region $E_4$, the direction of the relative position vector of the target pixel on the basis of the center position ($C_x$, $C_y$) of the hand the previous time does not contradict the direction of the optical flow. The same also applies to another pixel present in the region $E_1$. Moreover, in the case of another pixel present in the region $E_2$, it can also be likely that though the optical flow is not detected, a moving hand is displayed. However, in the case of another pixel present in the region $E_3$, the direction of the relative position vector is opposite the direction of the optical flow. In this case, it is less likely that the pixel displays a moving hand. That is, it can be determined whether or not a hand is a moving hand by using an inner product of the relative position vector and the optical flow. If it is determined in the processing at S134 that the inner product is negative, the routine proceeds to likelihood change processing (S150).

In the processing at S150, the hand tracking portion 17 sets the likelihood of the pixel to 0. When the processing at S150 is finished, the routine proceeds to background likelihood update processing (S142).

On the other hand, in the processing at S134, if it is determined the inner product is not negative, the routine proceeds to likelihood calculation processing (S136). In the processing at S136, the hand tracking portion 17 calculates the likelihood of the target pixel using the likelihood histogram for tracking created by executing the control processing illustrated in FIG. 18. For example, the likelihood is specified on the basis of the color ID of the target pixel by referring to the histogram illustrated in (D) of FIG. 19. When the processing at S136 is finished, the routine proceeds to weight calculation processing (S138).

In the processing at S138, the hand tracking portion 17 calculates a weight of the motion. The hand tracking portion 17 calculates a weight mw of the motion by using the motion amount (dx, dy) obtained in the processing at S130 by using the following formula 12, for example:

[Formula 12]

$$mw=|dx|+|dy| \quad (12)$$

When the processing at S138 is finished, the routine proceeds to likelihood determination processing (S140).

In the processing at S140, the hand tracking portion 17 determines the final likelihood by using the likelihood calculated at S136, the evaluation value yw calculated in the processing at S130, and the weight mw of the motion calculated in the processing at S138. Assuming that the likelihood calculated at S136 is w, the hand tracking portion 17 determines a final likelihood P by using the following formula 13, for example:

[Formula 13]

$$P=(w+mw)\cdot yw \quad (13)$$

When the processing at S140 is finished, the routine proceeds to background likelihood update processing (S142).

In the processing at S142, the hand tracking portion 17 substitutes the likelihood determined in the processing at S140 or S150 in the image for updating the background likelihood. The image for updating the background likelihood is an image required to obtain an image of the background likelihood in the image frames this time from the image of the background likelihood the previous time. Details of the background likehood image will be described later. The hand tracking portion 17 substitutes the likelihood in the image for updating the background likelihood as a pixel value, for example. When the processing at S142 is finished, the routine proceeds to background likelihood obtainment processing (S144).

The processing at S144 is processing in which the hand tracking portion 17 obtains the background likelihood of the image frame the previous time corresponding to the target pixel. For example, it can be obtained by using the background likelihood image, which will be described later. When the processing at 8144 is finished, the routine proceeds to background likelihood subtraction processing (S146).

In the processing at S146, the hand tracking portion 17 subtracts the background likelihood obtained in the processing at 8144 from the likelihood P determined in the processing at S140. When the processing at S146 is finished, the routine proceeds to likelihood image creation processing (S148).

In the processing at S148, the hand tracking portion 17 substitutes the likelihood calculated in the processing at S146 in the likelihood image for tracking. When the processing at S148 is finished, the control processing illustrated in FIG. 20 is finished.

The control processing illustrated in FIG. 20 is finished as above. By executing the control processing illustrated in FIG. 20 for all the pixels, a likelihood image having the likelihood as a pixel value can be created. An example of the likelihood image is shown in FIG. 22. In FIG. 22, a white portion is a moving region (region with high likelihood), and a black portion is a still region (region with low likelihood).

Figure 23:
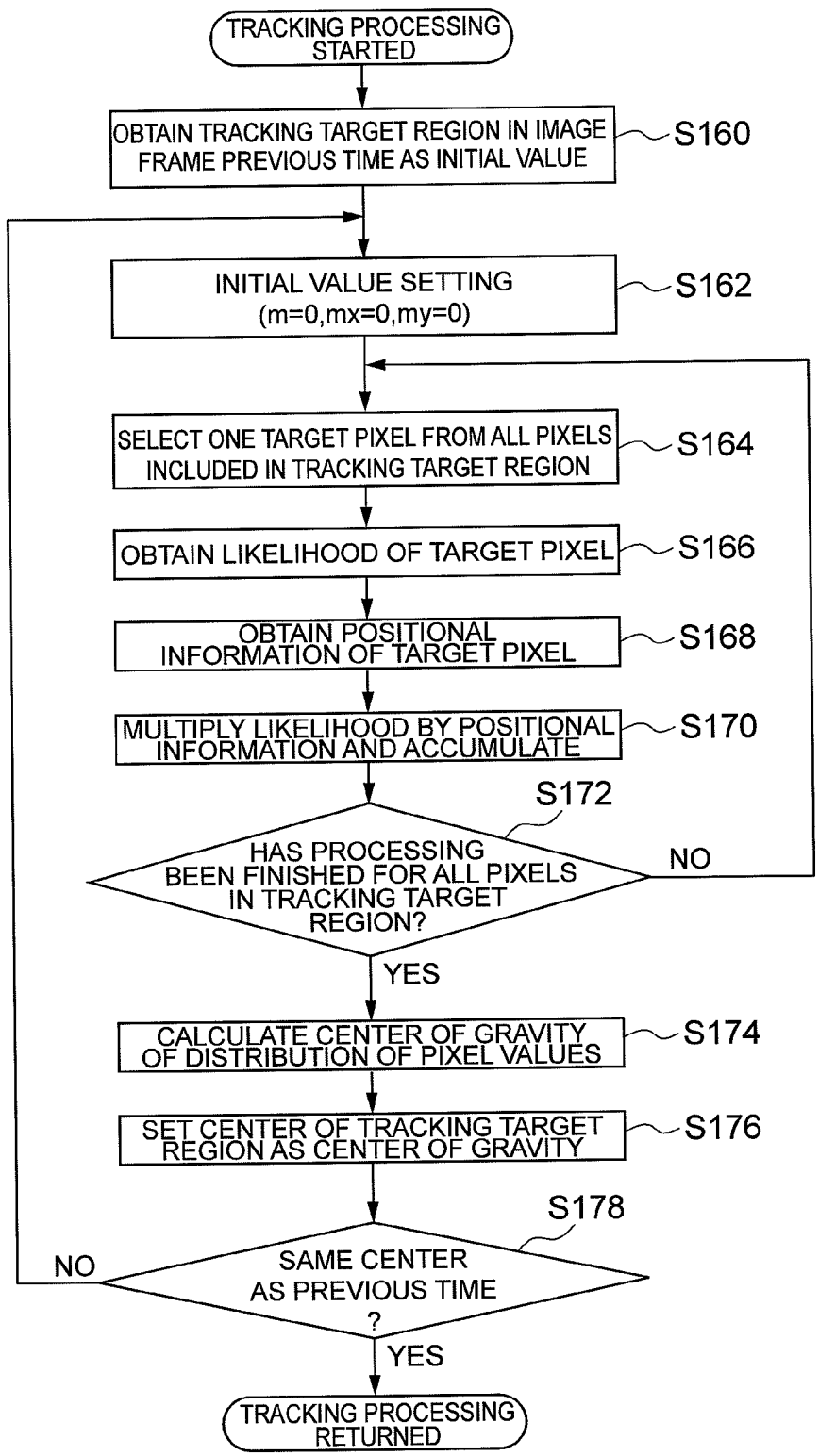
FIG. 23 is a flowchart for explaining a tracking operation of the moving object tracking device illustrated in FIG. 16.
Figure 24:
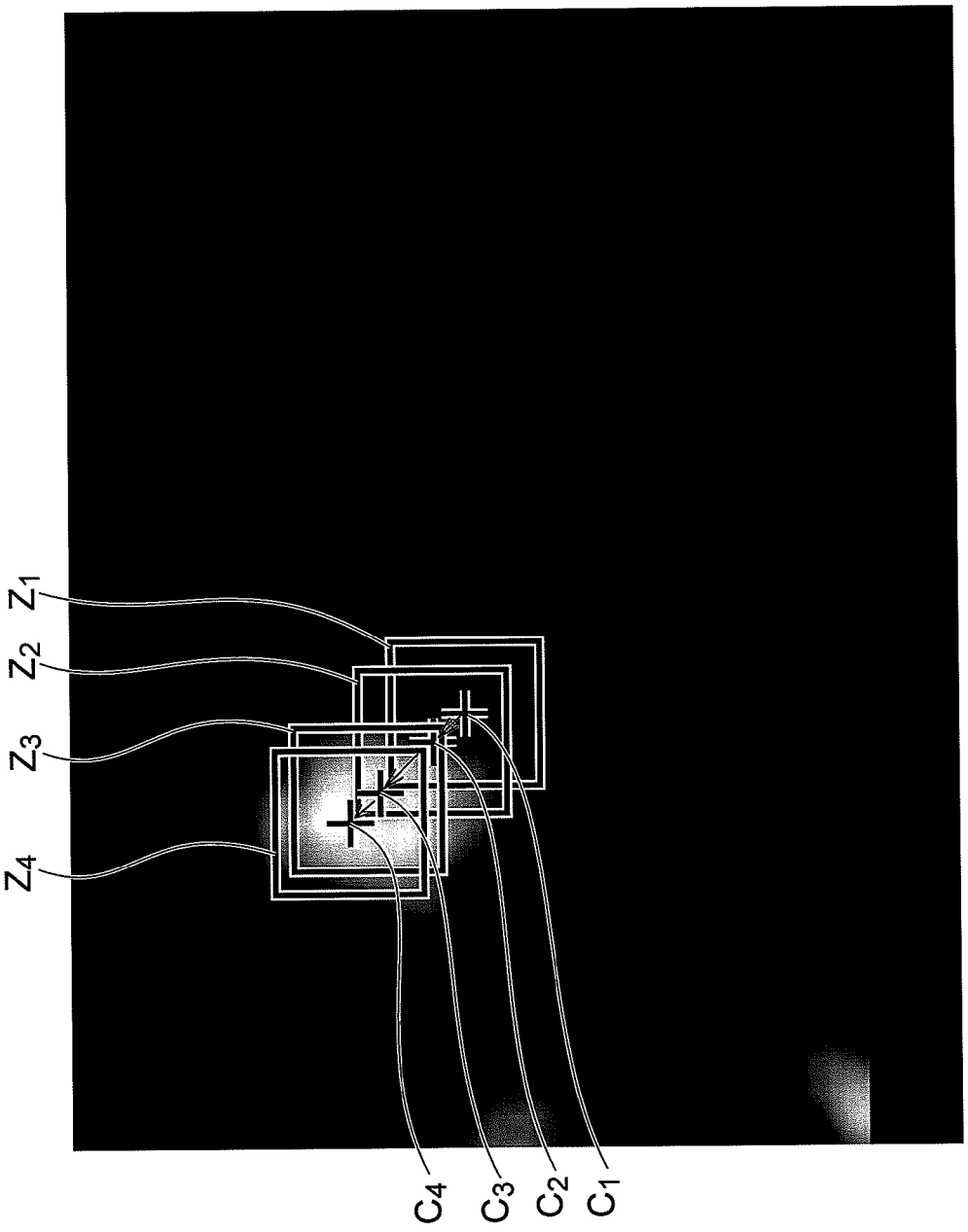
FIG. 24 is an outline diagram for explaining the tracking operation.

Subsequently, details of the tracking processing (S100) in FIG. 17 will be described. FIG. 23 is a flowchart illustrating a tracking operation of the hand tracking device 4 according to this embodiment. Considering ease of understanding of the explanation, the tracking operation will be described by referring to FIG. 24. FIG. 24 is an outline diagram for explaining the tracking operation.

As illustrated in FIG. 23, the hand tracking portion 17 obtains information (positional information and the like) of the tracking target region in the image frame the previous time as an initial value (S160). The tracking target region is a region smaller than an image frame and a likelihood image and set to have a size that includes a region with high likelihood illustrated in FIG. 22. When the processing at S160 is finished, the routine proceeds to initial value setting processing (S162).

In the processing at S162, the hand tracking portion 17 initializes parameters (mx, my) for calculating center coordinates to (0, 0). Also, the accumulated likelihood m is initialized to zero. When the processing at S162 is finished, the routine proceeds to pixel selection processing (S164).

In the processing at S164, the hand tracking portion 17 selects one pixel of a processing target form all the pixels corresponding to the tracking target region in the likelihood image created in the control processing illustrated in FIG. 20. When the processing at S164 is finished, the routine proceeds to likelihood obtainment processing (S166).

In the processing at S166, the hand tracking portion 17 obtains the likelihood w of the pixel selected in the processing at S164 from the likelihood image created in the control processing illustrated in FIG. 20. When the processing at S166 is finished, the routine proceeds to positional information obtainment processing (S168).

In the processing at S168, the hand tracking portion 17 obtains the positional information (coordinate information (x, y)) of the pixel selected in the processing at S164. When the processing at S168 is finished, the routine proceeds to accumulation processing (S170).

In the processing at S170, the hand tracking portion 17 updates the accumulated positional information (mx, my) and the accumulated likelihood m on the basis of the likelihood w obtained in the processing at S166 and the positional information (x, y) obtained in the processing at S168. The hand tracking portion 17 adds the likelihood w to the accumulated likelihood m. At this time, the hand tracking portion 17 may weight the likelihood in accordance with the distance between the positional information of the pixel and the center coordinates of the tracking rectangle and add the weighted likelihood to the accumulated likelihood m. For example, by preparing Gaussian distribution having the center coordinates of the tracking rectangle as one, the value of the Gaussian distribution according to the distance from the center coordinates may be multiplied by the likelihood. Also, the value (w·x, w·y) obtained by multiplying the positional information (x, y) by the likelihood w is added to the accumulated positional information (mx, my). When the processing at S170 is finished, the routine proceeds to finish determination processing (S172).

In the processing at S172, the hand tracking portion 17 determines whether or not the processing has been finished for all the pixels included in the tracking target region. In the processing at S172, if it is determined that the processing has not been finished for all the pixels, the routine goes to the processing at S164 again. As a result, the processing at S164 to S172 is repeatedly executed till the processing has been finished for all the pixels included in the tracking target region. On the other hand, in the processing at S172, if it is determined that the processing has been finished for all the pixels, the routine proceeds to gravity center calculation processing (S174).

In the processing at S174, the hand tracking portion 17 estimates the center of gravity of the distribution of pixel values (that is, the center position $(C_x, C_y)$ of the hand, which is a moving object) on the basis of the accumulated positional information (mx, my) and the accumulated likelihood m. For example, the hand tracking portion 17 estimates the center position $(C_x, C_y)$ by using the following formula 14:

[Formula 14]

$$(C_x, C_y) = \left(\frac{mx}{m}, \frac{my}{m}\right) \quad (14)$$

When the processing at S174 is finished, the routine proceeds to center change processing of the tracking target region (S176).

In the processing at S176, the hand tracking portion 17 sets the center of the tracking target region to $(C_x, C_y)$ calculated in the processing at S174. When the processing at S174 is finished, the routine proceeds to change determination processing (S178).

In the processing at S178, the hand tracking portion 17 determines whether or not the center of the tracking target region is the same as the center the previous time. In the processing at S178, if it is determined that the center of the tracking target region is not the same as the center the previous time, the routine goes to the processing at S162 again. As a result, the processing at S162 to S178 is repeatedly executed till the center of gravity of the pixel values in the tracking rectangle converges to the rectangle center. By executing this repeated processing, for example, a tracking rectangle $Z_1$ (center $C_1$) illustrated in FIG. 24 can be shifted to a tracking rectangle $Z_2$ (center $C_2$), a tracking rectangle $Z_3$ (center $C_3$), and the tracking rectangle $Z_4$ (center $C_4$) to upper left as shown by arrows so as to track the position of the hand, which is a moving object. On the other hand, if it is determined in the processing at S178 that the center of the tracking target region is the same as the center the previous time, the control processing illustrated in FIG. 23 is finished.

The control processing illustrated in FIG. 23 is finished as above. By executing the control processing illustrated in FIG. 23, a hand, which is a moving object, can be tracked by using the likelihood image and the tracking rectangle.

Figure 25:
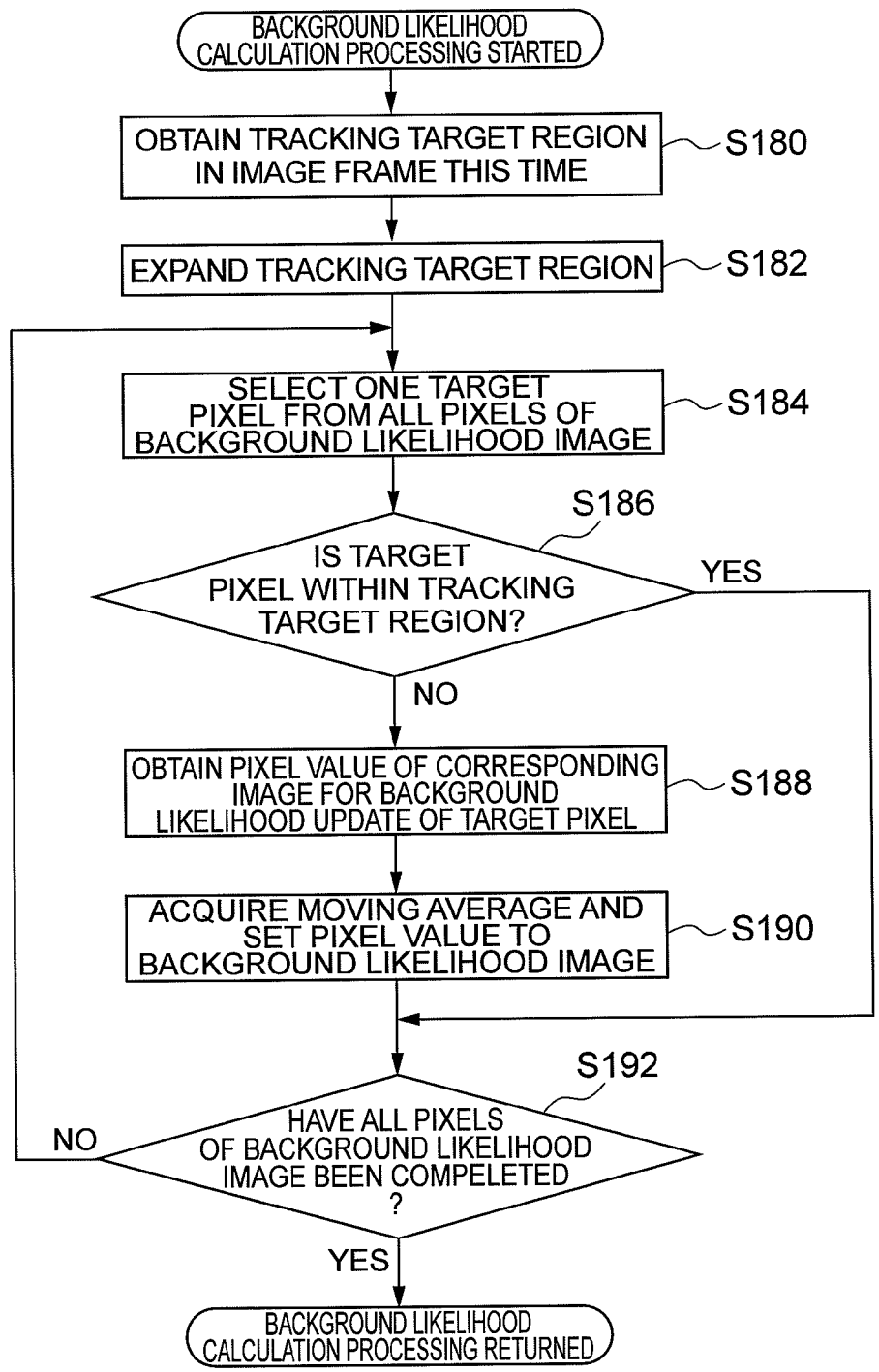
FIG. 25 is a flowchart for explaining a background likelihood calculation operation of the moving object tracking device illustrated in FIG. 16.

Subsequently, details of the calculation processing (S102) of the background likelihood in FIG. 17 will be described. FIG. 25 is a flowchart illustrating a calculating operation of the background likelihood of the hand tracking device 4 according to this embodiment. Considering ease of understanding of the explanation, the calculating operation of the background likelihood will be described by referring to FIG. 26. FIG. 26 is an outline diagram for explaining the calculating operation of the background likelihood.

As illustrated in FIG. 25, the hand tracking portion 17 obtains the information (positional information and the like) of the tracking target region in the image frame the previous time as an initial value (S180). This processing is the same as the processing at S160 in FIG. 23. When the processing at S180 is finished, the routine proceeds to region expansion processing (S182).

In the processing at S182, the hand tracking portion 17 expands the tracking target region obtained in the processing at S180. For example, the hand tracking portion 17 doubles only the size without changing the center position of the tracking target region obtained in the processing at S180. When the processing at S182 is finished, the routine proceeds to pixel selection processing (S184).

In the processing at S184, the hand tracking portion 17 selects one pixel to become a processing target from all the pixels of the background likelihood image. When the processing at S184 is finished, the routine proceeds to position determination processing (S186).

In the processing at S186, the hand tracking portion 17 determines whether or not the position of the pixel selected in the processing at S184 is within a tracking target region expanded in the processing at S182. In the processing at S186, if it is determined that the selected pixel is not within the tracking target region, the routine proceeds to pixel value obtainment processing (S188).

In the processing at S188, the hand tracking portion 17 refers to the image for background likelihood update created in the processing at S142 in FIG. 20 and obtains a pixel value corresponding to the position of the pixel selected in the processing at S184 from the image for background likelihood update. When the processing at S188 is finished, the routine proceeds to pixel value setting processing (S190).

In the processing at S190, the hand tracking portion 17 sets the pixel value of the background likelihood image on the basis of the pixel value of the pixel selected in the processing at S184 and the pixel value obtained in the processing at S188. Assuming that the pixel value of the pixel selected in the processing at S184 is $G_1$ and the pixel value obtained in the processing at S188 is $G_2$, the hand tracking portion 17 sets a final pixel value $G_F$ by acquiring a weighted average. Specifically the value is calculated by using the following formula 15:

[Formula 15]

$$G_F = \frac{G_1 + G_2}{2} \qquad (15)$$

When the processing at S190 is finished, the routine proceeds to finish determination processing (S192).

On the other hand, in the processing at S186, if it is determined that the selected pixel is within the tracking target region, the routine proceeds to the finish determination processing (S192).

In the processing at S192, the hand tracking portion 17 determines whether or not the processing has been finished for all the pixels in the background likelihood image. In the processing at S192, if it is determined that the processing has not been finished for all the pixels, the routine goes to the processing at S184 again. As a result, the processing at S184 to S192 is repeatedly executed till the processing has been completed for all the pixels of the background likelihood image. As a result, the background likelihood image is created. For example, as illustrated in (A) of FIG. 26, it is assumed that a tracking rectangle $Z_5$ is set in the likelihood image of the image frame the previous time. By repeatedly executing the processing at S184 to S192, the background likelihood image illustrated in (B) of FIG. 26 is created. As illustrated in (B) of FIG. 26, in the background likelihood image, a region corresponding to the position of the tracking rectangle $Z_5$ and having the size twice the tracking rectangle $Z_5$ is set as a black region $Y_1$ (that is, a region which is less likely to be a background). On the other hand, if it is determined in the processing at S192 that the processing has been finished for all the pixels, the control processing illustrated in FIG. 25 is finished.

The control processing illustrated in FIG. 25 is finished as above. By executing the control processing illustrated in FIG. 25, the background likelihood image is created. As a result, as described in the processing at S146 in FIG. 20, detection of a moving object can be performed more properly by using the background likelihood image. Assuming that the likelihood image of the image frame this time is (C) of FIG. 26 and the background likelihood image is (B) of FIG. 26, creation of the likelihood image (difference image) considering the background illustrated in (D) of FIG. 26 is made possible by the processing at S146 in FIG. 20. By using the difference image, even if the color similar to the hand, which is a moving object, is present as a background, the hand can be tracked accurately without tracking the color of the background.

Subsequently, a hand tracking program (moving-object tracking program) that allows the device (computer) 2 to function as the above hand tracking device 4 will be described.

The hand tracking program includes a main module, an input module, and a calculation processing module. The main module is a portion that totally controls image processing. The input module operates the device 2 so as to obtain an input image. The calculation processing module includes a motion degree obtaining module, a detection region setting module, a color obtaining module, an evaluation score calculating module, a moving object detecting module, a likelihood calculating module, and a moving object tracking module. The functions realized by executing the main module, the input module, and the calculation processing module are similar to the functions of the image input portion 10, the motion degree obtaining portion 11, the detection region setting portion 12, the color obtaining portion 13, the evaluation score calculating portion 14, the hand detecting portion 15, the likelihood calculating portion 16, and the hand tracking portion 17 of the above-described hand tracking device 4.

The hand tracking program is provided by a storage medium such as a ROM or a semiconductor memory, for example. The hand tracking program may be provided as a data signal through a network.

In the hand detecting device 4 according to the third embodiment, a motion degree of a pixel between image frames is obtained by the motion degree obtaining portion 11, the color of the pixel included in the image frame is obtained by the color obtaining portion 13, an evaluation score indicating the motion level of the color is calculated by the evaluation score calculating portion 14 on the basis of the motion degree for each color, the color of a hand is specified by the hand detecting portion 15 on the basis of the evaluation score for each color, likelihood is calculated by the likelihood calculating portion 16 for each color on the basis of similarly of the color to the specified color of the hand, and the hand is tracked by the hand tracking portion 17 by creating a likelihood image having the likelihood of the pixel as a pixel value on the basis of the likelihood for each color and the image frame. As described above, by evaluating the motion level of the color, a hand is detected. Then, the hand is tracked on the basis of the detected color of the hand. Thus, a hand can be detected and tracked without setting information relating to the hand or a background in advance similarly to the first embodiment. That is, since it is not necessary to set a specific color as the background color or the color of the hand in advance, flexible handling of color distribution is made possible, and even if lighting is changed, a location is changed or clothes are changed, the representative color of the hand can be detected all the time. Even a hand covered by a glove, for example, can be detected and tracked. Thus, detection of a hand can be made extremely stably against an environmental change. Also, even if a still object having a similar color is present other than the hand in the same frame, the moving hand can be accurately detected since the color used for the hand other than the similar color can be set as the representative color. Also, as in the prior-art devices, if the color of the hand is set in advance for detecting the hand, the color of the difference between the background and the hand needs to be large to some degree. On the other hand, in the hand detecting device 1 according to this embodiment, as long as the section (class) of the histogram is different, even if the color of the difference between the hand and the background is small, detection and tracking are possible in principle. Also, since it is possible to detect and track a moving hand from color information without separating the hand from the background, processing such as setting of a threshold value for background separation can be made unnecessary. Also, since the hand is detected and tracked by the color information and the motion level, detection accuracy does not depend on motion continuity or accuracy. Therefore, a hand with quick movement can be detected and tracked properly.

Also, according to the hand tracking device 4 according to the third embodiment, a moving object can be tracked on the basis of the color of the moving object detected by the hand detecting device 1 according to the first embodiment or the color in the region detected by the object detecting device 3 according to the second embodiment.

Also, according to the hand tracking device 4 according to the third embodiment, the number of foreground pixels obtained by accumulating the number of pixels whose motion degree is a predetermined value or more and the number of background pixels obtained by accumulating the number of pixels whose motion degree is not more than the predetermined value are calculated by the evaluation score calculating portion 14 for each color, and the likelihood is reduced by the likelihood calculating portion 16 for the color whose number of foreground pixels is smaller than the number of background pixels. Thus, tracking of a background or the like having a color close to the color of the hand and with less motion as a hand can be avoided.

Also, according to the hand tracking device 4 according to the third embodiment, if the inner product of the relative position vector of the pixel on the basis of the position of the hand the previous time and the motion vector of the pixel is negative, the likelihood in the pixel is reduced by the hand tracking portion 17. Thus, tracking of a background or the like having a color close to the color of the hand and with different motion as a hand can be avoided.

Also, according to the hand tracking device 4 according to the third embodiment, by moving the tracking rectangle by the hand tracking portion 17 so that the center of gravity of the distribution of the pixel values in the tracking rectangle of the likelihood image comes to the center of the tracking rectangle, the hand is tracked. Thus, a hand can be properly tracked with a simple configuration.

Also, according to the hand tracking device 4 according to the third embodiment, the background likelihood image is created on the basis of the likelihood image of the image frame input the previous time and the tracking rectangle, and a hand is tracked by using a difference image between the likelihood image of the image frame and the background likelihood image by the hand tracking portion 17. Thus, tracking of a background and the like with the color close to the color of the hand as a hand can be avoided.

Moreover, the hand tracking method (moving object tracking method) and the hand tracking program according to this embodiment exert the same advantages as those of the above-described hand tracking device 4.

The above-described embodiments illustrate examples of the moving object detecting device and the moving object tracking device according to the present invention and their methods and programs and not limited to the devices, methods, and programs according to the embodiments but may be modified or applied to others.

For example, in the above-described embodiments, the example in which the image input portion 10 inputs an image from the camera 20 was described, but it may be an image transmitted from another device through a network.

Also, in each of the above-described embodiments, the example in which the hand detecting device 1 includes the detection region setting portion 12 was described, but the detection region setting portion 12 may be provided as necessary.

REFERENCE SIGNS LIST 1 moving object detecting device, 3 hand tracking device, 10 image input portion, 11 motion degree obtaining portion, 12 detection region setting portion, 13 color obtaining portion, 14 evaluation score calculating portion, 15 hand detecting portion (moving object detecting portion), 16 likelihood calculating portion (moving object tracking portion), 17 hand tracking portion (moving object tracking portion)

The invention claimed is:

1. A moving object detecting device that detects a moving object by using an image, the device comprising:
  a motion degree obtaining portion configured to obtain a motion degree of a pixel between image frames;
  a color obtaining portion configured to obtain a color of the pixel included in the image frame;
  an evaluation score calculating portion configured to calculate an evaluation score indicating a motion level of the color on the basis of the motion degree for each color obtained by the color obtaining portion; and
  a moving object detecting portion configured to detect the moving object on the basis of the evaluation score for each color;
  wherein one or more of the motion degree obtaining portion, the color obtaining portion, the evaluation score calculation portion and the moving object detection portion are implemented via a CPU.

2. The moving object detecting device according to claim 1, wherein
  the evaluation score calculating portion is further configured to accumulate the number of pixels in the image frame and the motion degree of the pixel for each color and to calculate the evaluation score of the color on the basis of the accumulated number of pixels and the accumulated motion degree in the image frame.

3. The moving object detecting device according to claim 2, wherein
  the evaluation score calculating portion is further configured to accumulate positional information of the pixel for each color; and
  the moving object detecting portion is further configured to specify the position of the moving object on the basis of the accumulated number of pixels and the accumulated positional information for each color.

4. A moving object detecting method for detecting a moving object by using an image, the method comprising the steps of:
  obtaining a motion degree of a pixel between a first image frame and a second image frame input after the first image frame and a color of the pixel included in the second image frame;
  calculating an evaluation score indicating a motion level of the color on the basis of the motion degree for each color obtained in the obtaining step; and
  detecting the moving object drawn in the second image frame on the basis of the evaluation score for each color.

5. A non-transitory computer-readable storage medium storing a moving object detection program for causing a computer to function so as to detect a moving object by using an image, the program causing the computer to function as:
  a motion degree obtaining portion that obtains a motion degree of a pixel between image frames;
  a color obtaining portion that obtains a color of the pixel included in the image frame; an evaluation score calculating portion that calculates an evaluation score indicating a motion level of the color on the basis of the motion degree for each color obtained by the color obtaining portion; and
  a moving object detecting portion that detects the moving object on the basis of the evaluation score for each color.

6. A moving object tracking device that tracks a moving object by using an image, the device comprising:
- a motion degree obtaining portion configured to obtain a motion degree of a pixel between image frames;
- a color obtaining portion configured to obtain a color of the pixel included in the image frame;
- an evaluation score calculating portion configured to calculate an evaluation score indicating a motion level of the color on the basis of the motion degree for each color obtained by the color obtaining portion;
- a moving object detecting portion configured to detect the moving object by creating a first likelihood image having the evaluation score as a pixel value on the basis of the color of the pixel and the evaluation score for each color; and
- a moving object tracking portion configured to track the detected moving object;
- wherein one or more of the motion degree obtaining portion, the color obtaining portion, the evaluation score calculating portion, the moving object detection portion and the moving object tracking portion are implemented via a CPU.

7. The moving object tracking device according to claim 6, wherein
the motion degree obtaining portion is further configured to divide the image frame into predetermined blocks, to calculate the motion of the entire image frame on the basis of the motion by the unit of block, and to calculate the motion degree by subtracting the motion of the entire image frame from the motion of the pixel included in the image frame.

8. The moving object tracking device according to claim 6, wherein the moving object tracking portion is further configured to track the moving object on the basis of the color of the moving object detected by the moving object detecting portion.

9. The moving object tracking device according to claim 8, wherein
the moving object tracking portion is further configured to specify a representative color of the moving object on the basis of the evaluation score and to track the moving object on the basis of the specified representative color.

10. The moving object tracking device according to claim 9, wherein
the moving object tracking portion is further configured to calculate likelihood for each color on the basis of similarity in color to the representative color of the moving object and to create a second likelihood image having the likelihood of the pixel as a pixel value so as to track the moving object.

11. The moving object tracking device according to claim 10, wherein
the evaluation score calculating portion is further configured to calculate the number of foreground pixels obtained by accumulating the number of pixels that have the motion degree of a predetermined value or more, and the number of background pixels obtained by accumulating the number of pixels that have the motion degree of not more than the predetermined value, for each color; and
the moving object tracking portion is further configured to reduce the likelihood for the color for which the number of foreground pixels is smaller than the number of background pixels.

12. The moving object tracking device according to claim 10, wherein
the moving object tracking portion is further configured to reduce the likelihood of the pixel as the pixel value if an inner product of a relative position vector of the pixel on the basis of the position of the moving object the previous time and the motion vector of the pixel is negative.

13. The moving object tracking device according to claim 10, wherein
the moving object tracking portion is further configured to set a region smaller than the second likelihood image as a tracking rectangle and to track the moving object by moving the rectangle so that the center of gravity of distribution of pixel values in the tracking rectangle of the second likelihood image comes to the center of the tracking rectangle.

14. The moving object tracking device according to claim 10, wherein
the moving object tracking portion is further configured to track the moving object by using a difference image between a background likelihood image created on the basis of the second likelihood image of the image frame input the previous time and the tracking rectangle and the second likelihood image of the image frame.

15. A moving object tracking method for tracking a moving object by using an image, the method comprising the steps of:
- obtaining a motion degree of a pixel between image frames and a color of the pixel included in the image frame;
- calculating an evaluation score indicating a motion level of the color on the basis of the motion degree for each color obtained in the obtaining step;
- detecting the moving object by creating a first likelihood image having the evaluation score as a pixel value on the basis of the color of the pixel and the evaluation score for each color; and
- tracking the detected moving object.

16. A non-transitory computer-readable storage medium storing a moving object tracking program for causing a computer to function so as to track a moving object by using an image, the program causing the computer to function as:
- a motion degree obtaining portion that obtains a motion degree of a pixel between image frames;
- a color obtaining portion that obtains the color of the pixel included in the image frame;
- an evaluation score calculating portion that calculates an evaluation score indicating a motion level of the color on the basis of the motion degree for each color obtained by the color obtaining portion;
- a moving object detecting portion that detects the moving object by creating a first likelihood image having the evaluation score as a pixel value on the basis of the color of the pixel and the evaluation score for each color; and
- a moving object tracking portion that tracks the detected moving object.

17. The moving object tracking device according to claim 7, wherein
the moving object tracking portion is further configured to track the moving object on the basis of the color of the moving object detected by the moving object detecting portion.

18. The moving object tracking device according to claim 17, wherein
the moving object tracking portion is further configured to specify a representative color of the moving object on the basis of the evaluation score and to track the moving object on the basis of the specified representative color.

19. The moving object tracking device according to claim 18, wherein the moving object tracking portion is further configured to calculate likelihood for each color on the basis of similarity in color to the representative color of the moving object and to create a second likelihood image having the likelihood of the pixel as a pixel value so as to track the moving object.

20. The moving object tracking device according to claim 19, wherein
the evaluation score calculating portion is further configured to calculate the number of foreground pixels obtained by accumulating the number of pixels that have the motion degree of a predetermined value or more, and the number of background pixels obtained by accumulating the number of pixels that have the motion degree of not more than the predetermined value, for each color; and
the moving object tracking portion is further configured to reduce the likelihood for the color for which the number of foreground pixels is smaller than the number of background pixels.

* * * * *